(12) United States Patent
Ueda et al.

(10) Patent No.: US 11,167,413 B2
(45) Date of Patent: Nov. 9, 2021

(54) ROBOT CONTROL APPARATUS, ROBOT, AND ROBOT SYSTEM

(71) Applicant: Seiko Epson Corporation, Tokyo (JP)

(72) Inventors: Junya Ueda, Azumino (JP); Masayuki Ilyama, Chino (JP); Tsuguya Kojima, Chino (JP); Yuki Yahiro, Matsumoto (JP)

(73) Assignee: Seiko Epson Corporation

( * ) Notice: Subject to any disclaimer, the term of this patent is extended or adjusted under 35 U.S.C. 154(b) by 288 days.

(21) Appl. No.: 16/392,673

(22) Filed: Apr. 24, 2019

(65) Prior Publication Data
US 2019/0329403 A1 Oct. 31, 2019

(30) Foreign Application Priority Data

Apr. 25, 2018 (JP) .............................. JP2018-084367

(51) Int. Cl.
*B25J 9/10* (2006.01)
*B25J 9/16* (2006.01)

(52) U.S. Cl.
CPC ............. *B25J 9/104* (2013.01); *B25J 9/1664* (2013.01)

(58) Field of Classification Search
CPC ............. A61B 34/71; A61B 2034/301; A61B 2034/305; A61B 34/30; A61B 2017/00398; A61B 2017/00477; A61B 2017/2929; A61B 2017/2932; A61B 34/37; A61B 2017/2927; A61B 17/29; A61B 2017/00039; A61B 2017/00199; A61B 2017/00212; A61B 2090/571;
(Continued)

(56) References Cited

U.S. PATENT DOCUMENTS

| 9,764,483 | B2 * | 9/2017 | Okahisa | .................... | B25J 18/00 |
| 2014/0013893 | A1 * | 1/2014 | Asano | .................... | H02G 15/00 74/490.02 |

(Continued)

FOREIGN PATENT DOCUMENTS

| JP | 2016-209967 A | 12/2016 |
| JP | 2017-224527 A | 12/2017 |

OTHER PUBLICATIONS

Yoshida et al., Development of robotic end effectors for insertion task in formation of rubber hoses, 2016, IEEE, pg. (Year: 2016).*

(Continued)

*Primary Examiner* — McDieunel Marc
(74) *Attorney, Agent, or Firm* — Harness, Dickey & Pierce, P.L.C.

(57) ABSTRACT

A robot control apparatus includes a processor that is configured to control a robot having a robot arm to which an end effector is attached. The processor is configured to: insert one end of a cable into a first connector while holding a side of one end of the cable using the end effector; store a position and a posture of a specific point on the cable or the end effector when the insertion of the one end of the cable into the first connector is completed; move the end effector along the cable toward a side of the other end of the cable based on an amount of movement toward the other end of the cable stored in advance and the position and the posture while guiding the cable using the end effector; hold the side of the other end of the cable using the end effector.

7 Claims, 23 Drawing Sheets

(58) Field of Classification Search
CPC ....... A61B 34/35; A61B 17/2909; A61B 1/04; A61B 2017/00314; A61B 2017/00327; A61B 2017/00973; A61B 2017/2902; A61B 2017/2905; A61B 2017/2906; A61B 2017/2918; A61B 2017/2933; A61B 2017/2939; A61B 2017/2948; A61B 2034/306; A61B 34/74; A61B 17/2812; B25J 9/1633; B25J 9/1687; B25J 9/1697; B25J 18/06; B25J 19/0025; B25J 15/0004; B25J 19/0029; B25J 17/02; B25J 18/00; B25J 9/0087; B25J 9/104; B25J 15/0253; B25J 9/06; B25J 9/1015; B25J 9/1612; B25J 13/085; B25J 15/0061; B25J 17/0266; B25J 17/0283; B25J 9/0078; B25J 9/1682; B25J 13/00; B25J 15/0033; B25J 15/0052; B25J 15/0433; B25J 15/0616; B25J 15/08; B25J 17/0241; B25J 19/02; B25J 19/023; B25J 9/0009; B25J 9/0015; B25J 9/1615; B25J 9/1664; B25J 9/1674; B25J 15/0038; B25J 9/0096; B25J 9/065; B25J 9/1602; Y10T 74/20311; Y10T 29/49174; Y10S 901/27; Y10S 901/29; Y10S 901/45; Y10S 901/15; Y10S 901/41; H02G 1/12; H02G 11/00; H02G 15/00; H02G 3/22; H02G 3/32; H02G 1/14; H02G 1/1248; B65H 75/36; B65H 75/4402; B65H 75/486; B65H 2701/34; B65H 57/08; B65H 75/4449; B65H 75/48; G05B 2219/40032; G05B 2219/40267; G05B 2219/40304; G05B 2219/39109; G05B 2219/39506; G05B 2219/37555; G05B 2219/39116; G05B 2219/40028; G05B 2219/40584; G05B 2219/45033; G05B 2219/45097; H01R 43/26; H01R 12/592; H01R 12/62; H01R 43/00; H01R 43/01; H01R 43/205

See application file for complete search history.

(56) References Cited

U.S. PATENT DOCUMENTS

| | | | |
|---|---|---|---|
| 2014/0102240 A1* | 4/2014 | Inada | B25J 17/0283 74/490.02 |
| 2019/0143509 A1* | 5/2019 | Matsuzawa | B25J 13/085 700/258 |
| 2020/0067255 A1* | 2/2020 | Takeyama | B25J 13/085 |
| 2020/0180157 A1* | 6/2020 | Ueda | B25J 9/1015 |

OTHER PUBLICATIONS

Bahrami et al., Optimal design of a spatial four cable driven parallel manipulator, 2011, IEEE, p. 2143-2149 (Year: 2011).*

Bemfica, A three-fingered cable-driven gripper for underwater applications, 2014, IEEE, p. 2469-2474 (Year: 2014).*

Koo et al., Development of a robot car wiring system, 2008, IEEE, p. 862-867 (Year: 2008).*

* cited by examiner

ROBOT CONTROL APPARATUS, ROBOT, AND ROBOT SYSTEM

The present application is based on and claims priority from JP Application Serial Number 2018-084367, filed Apr. 25, 2018, the disclosure of which is hereby incorporated by reference herein in its entirety.

BACKGROUND

1. Technical Field

The present disclosure relates to a robot control apparatus, robot, and robot system.

2. Related Art

Robots with robot arms each having a base and a plurality of arms (links) are known (for example, see JP-A-2016-209967). One arm of the adjacent two arms of the robot arm is pivotably coupled to the other arm via a joint part, and the arm on the most proximal end side (at the most upstream) is pivotably coupled to the base via a joint part. The joint parts are driven by motors and the arms pivot by driving of the joint parts. Further, as an end effector, e.g. a hand is detachably attached to the arm on the most distal end side (at the most downstream). The robot may perform work of gripping a connector as a first object with the hand and coupling the connector to another connector as a second object.

JP-A-2016-209967 is an example of the related art.

JP-A-2016-209967 discloses a robot that grips a cable with gripping hooks and inserts the cable into a connector. One end of the cable is positioned using e.g. a camera and gripped by the gripping hooks. However, when both ends of the cable are gripped, if one end is positioned, the position of the other end is not determined because the cable has flexibility. Therefore, it is necessary to further position the other end after positioning of one end, and it takes time to position both ends.

SUMMARY

An advantage of some aspects of the present disclosure is to solve the above described problem and the present disclosure can be realized as the following configurations.

A robot control apparatus according to an aspect of the present disclosure is a robot control apparatus that controls a robot having a robot arm to which an end effector is attached, holding a cable having flexibility using the end effector, coupling one end portion of the cable to a first connector, and inserting the other end portion of the cable into a second connector, the robot control apparatus allowing the robot to execute a first operation of holding a side of one end portion of the cable using the end effector and inserting the one end portion of the cable into the first connector, a second operation of storing a position and a posture of a specific point on the cable or the end effector when the insertion of the one end portion of the cable into the first connector is completed, a third operation of moving the end effector along the cable toward a side of the other end portion of the cable based on an amount of movement toward the other end portion of the cable stored in advance and the position and the posture while guiding the cable using the end effector, and holding the side of the other end portion of the cable using the end effector, and a fourth operation of inserting the other end portion of the cable into the second connector while holding the side of the other end portion of the cable using the end effector.

A robot according to an aspect of the present disclosure includes a robot arm and is controlled by the robot control apparatus according to the aspect of the present disclosure.

A robot system according to an aspect of the present disclosure includes a robot having a robot arm, and the robot control apparatus according to the aspect of the present disclosure that controls the robot.

DESCRIPTION OF EXEMPLARY EMBODIMENTS

As below, a robot control apparatus, a robot, and a robot system according to the present disclosure will be explained in detail based on preferred embodiments shown in the accompanying drawings.

First Embodiment

Figure 1:
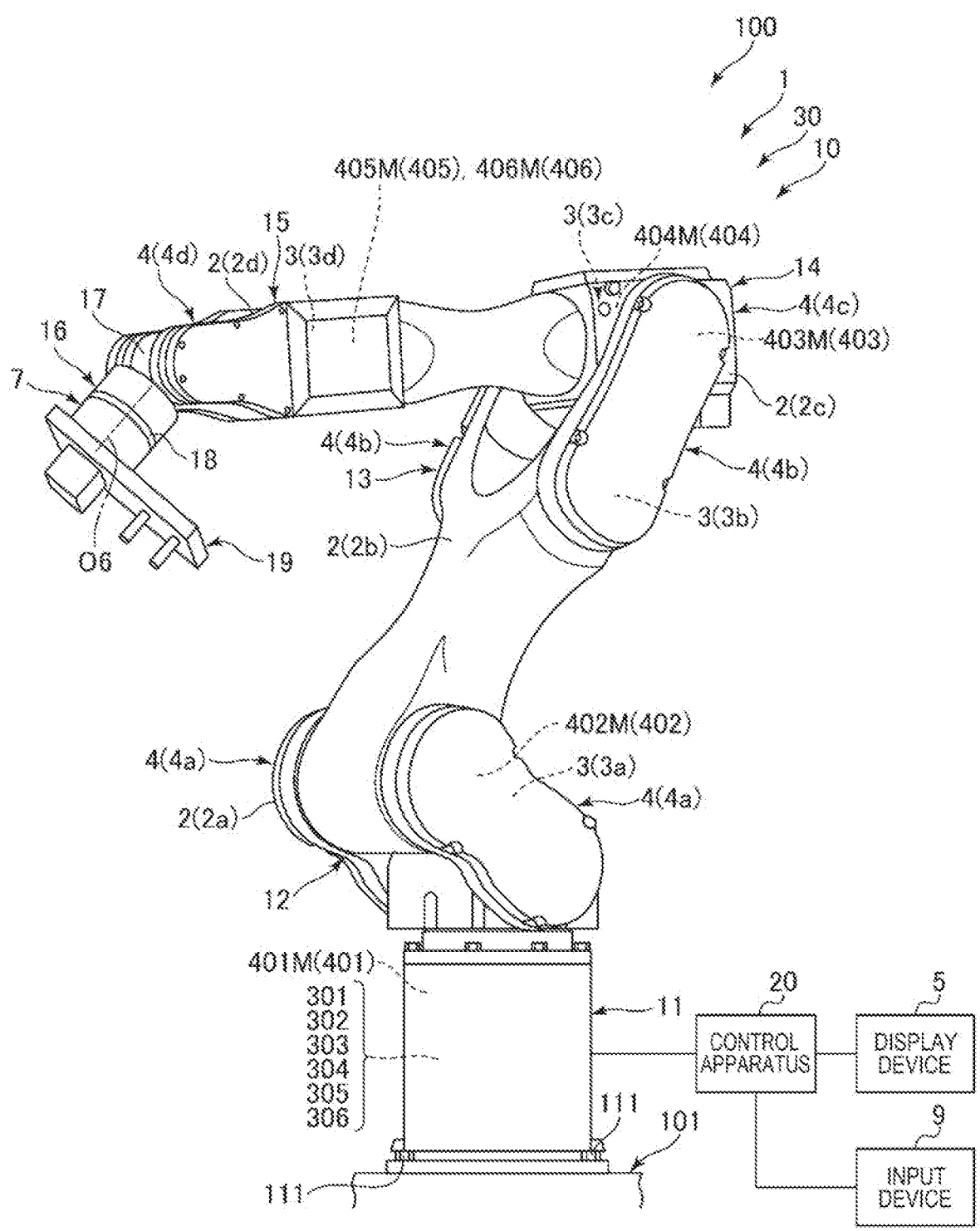
FIG. 1 is a perspective view (including a block diagram) showing a robot in a first embodiment of a robot system according to the present disclosure.
Figure 2:
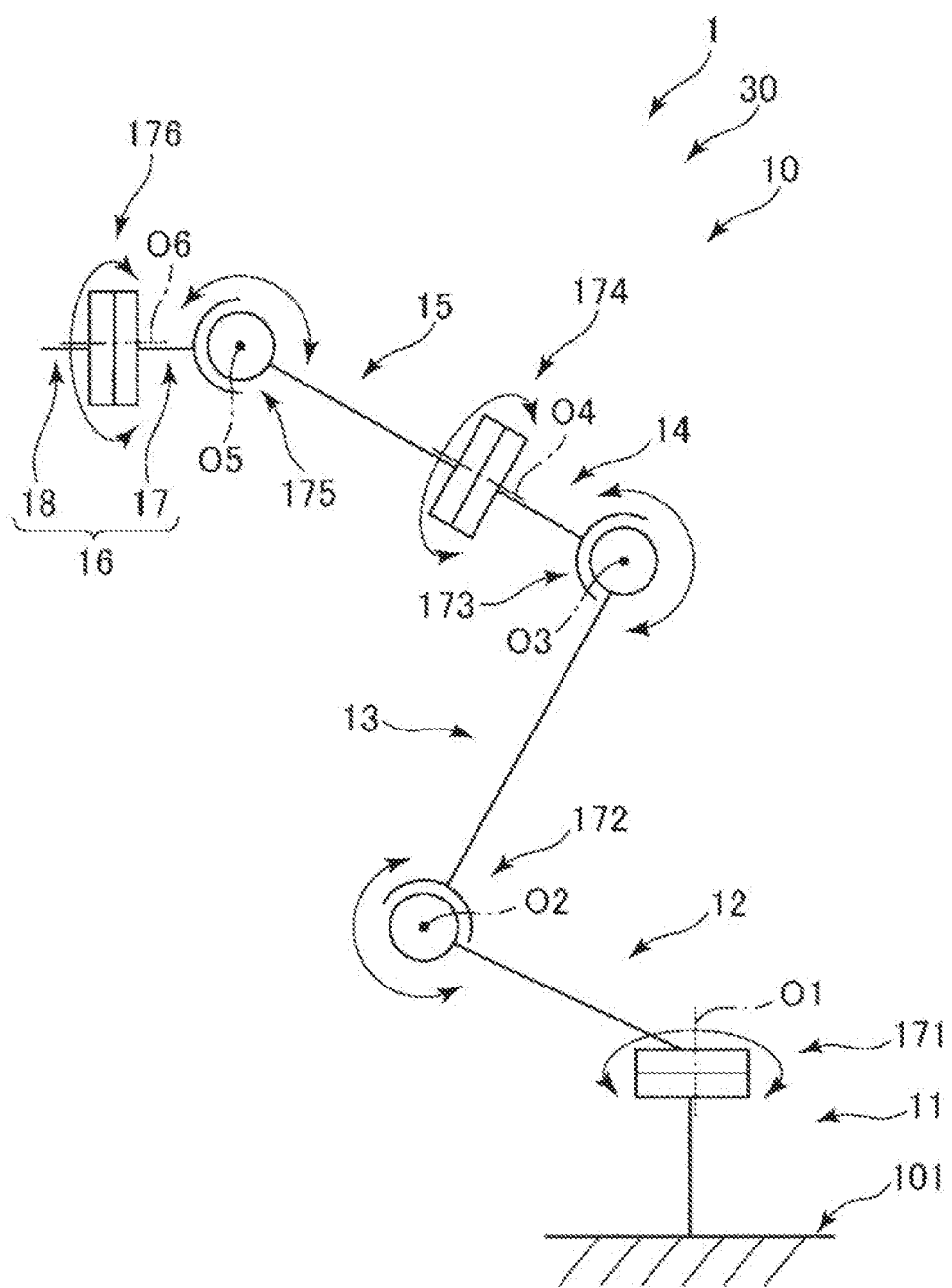
FIG. 2 is a schematic diagram of the robot shown in FIG. 1.
Figure 3:
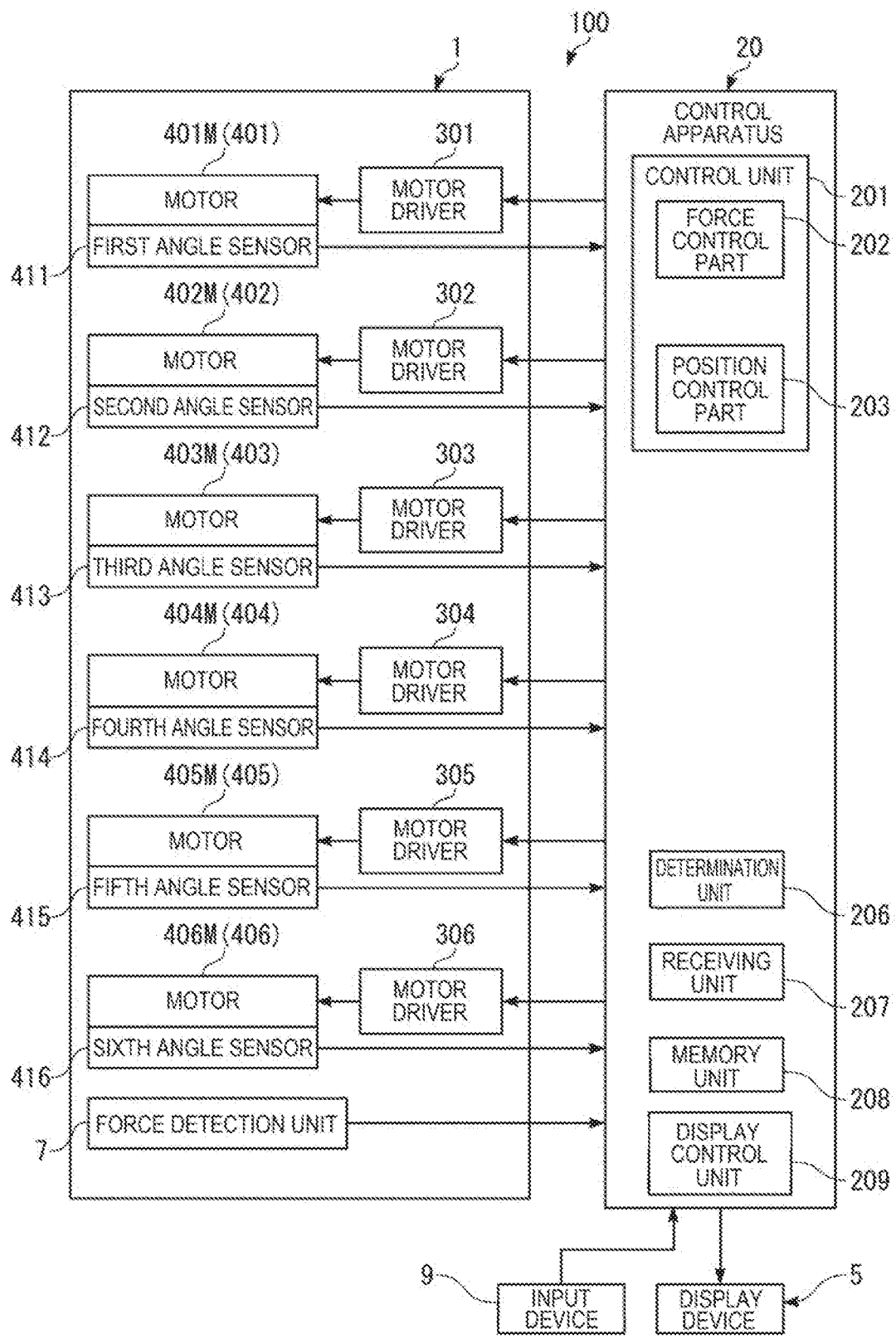
FIG. 3 is a block diagram showing a main part of the first embodiment of the robot system according to the present disclosure.
Figure 4:
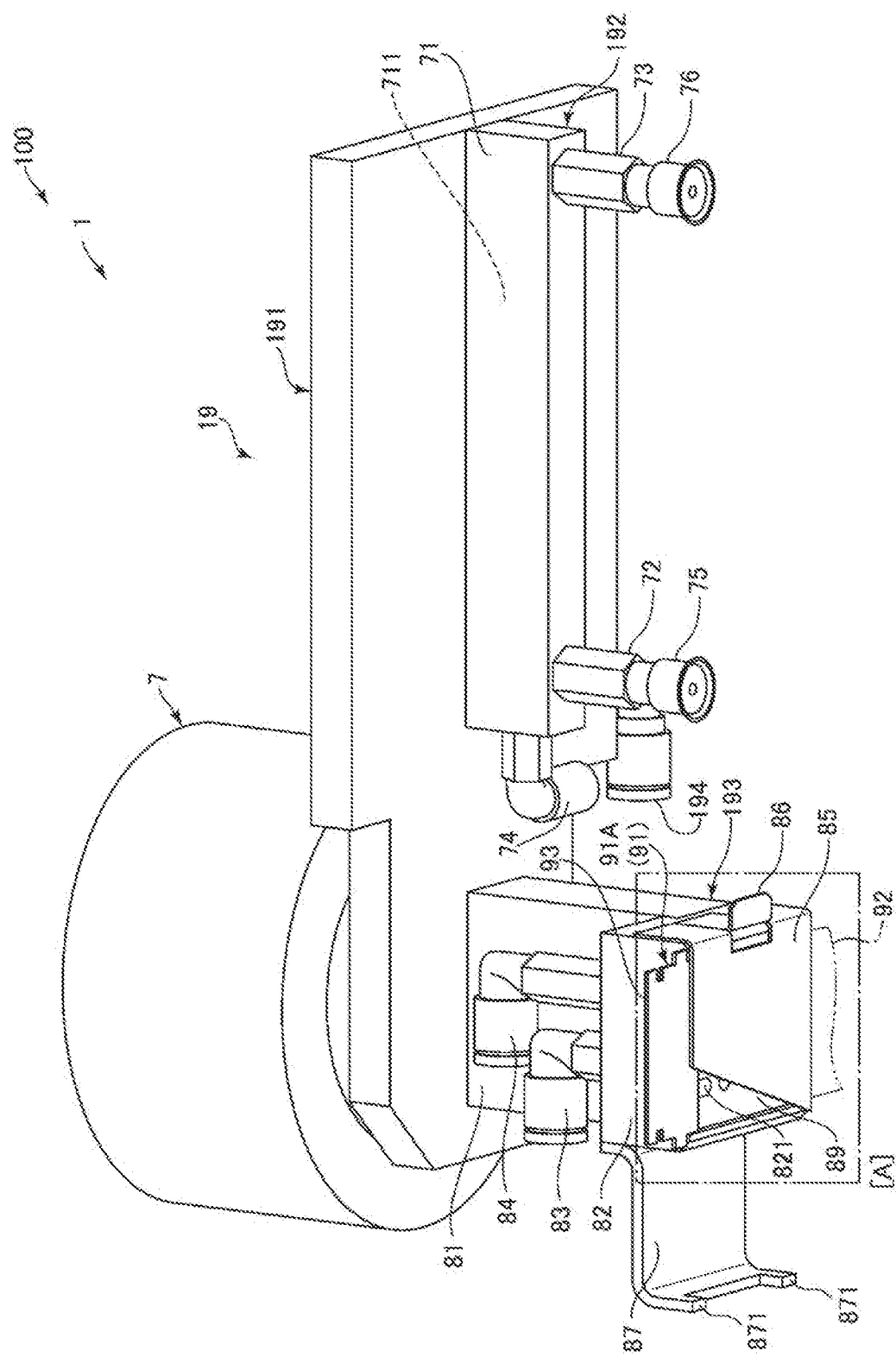
FIG. 4 is a perspective view showing an end effector to be attached to the robot shown in FIG. 1.
Figure 5:
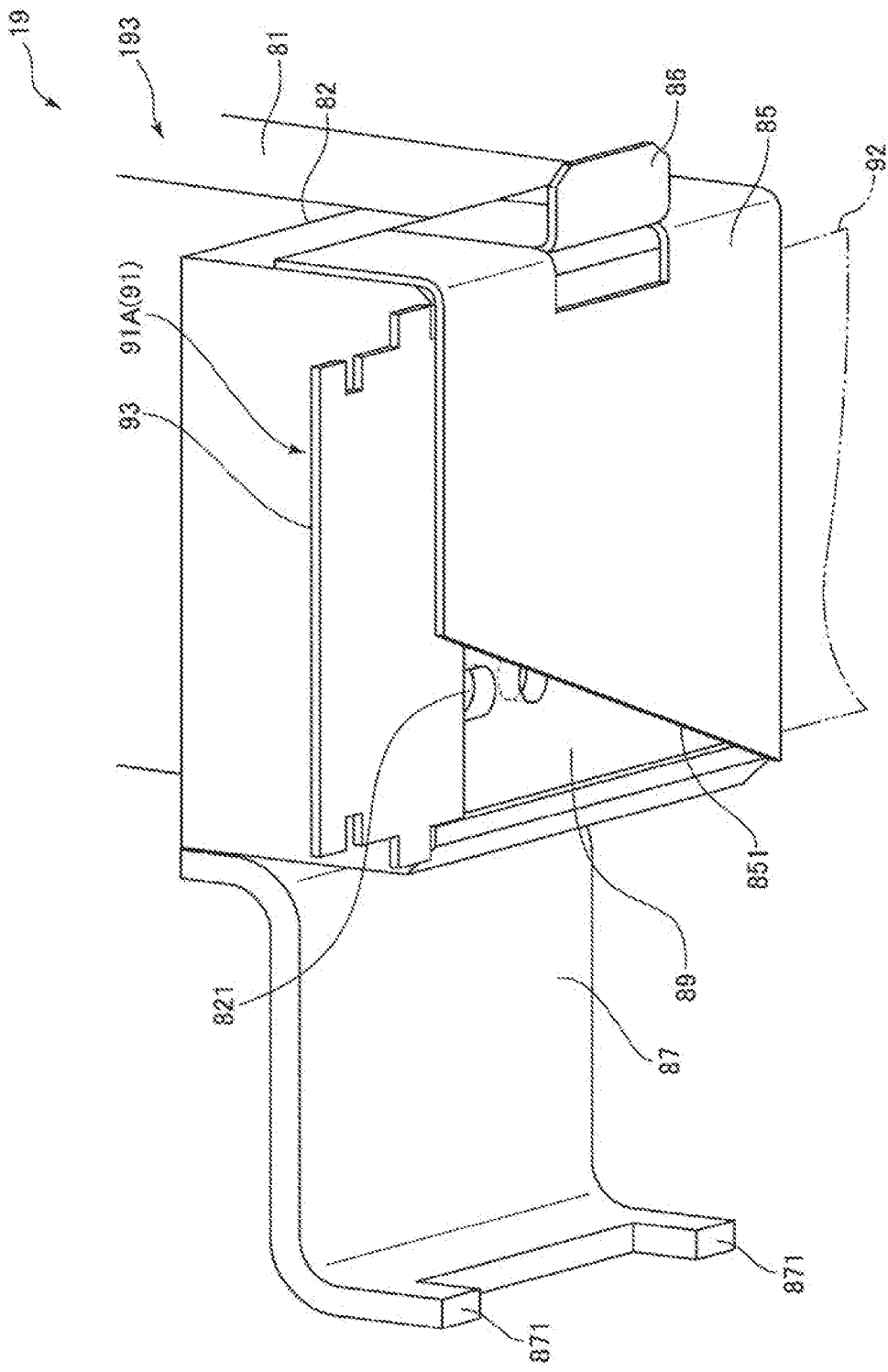
FIG. 5 is an enlarged view of an area [A] surrounded by a dashed-dotted line in FIG. 4.
Figure 6:
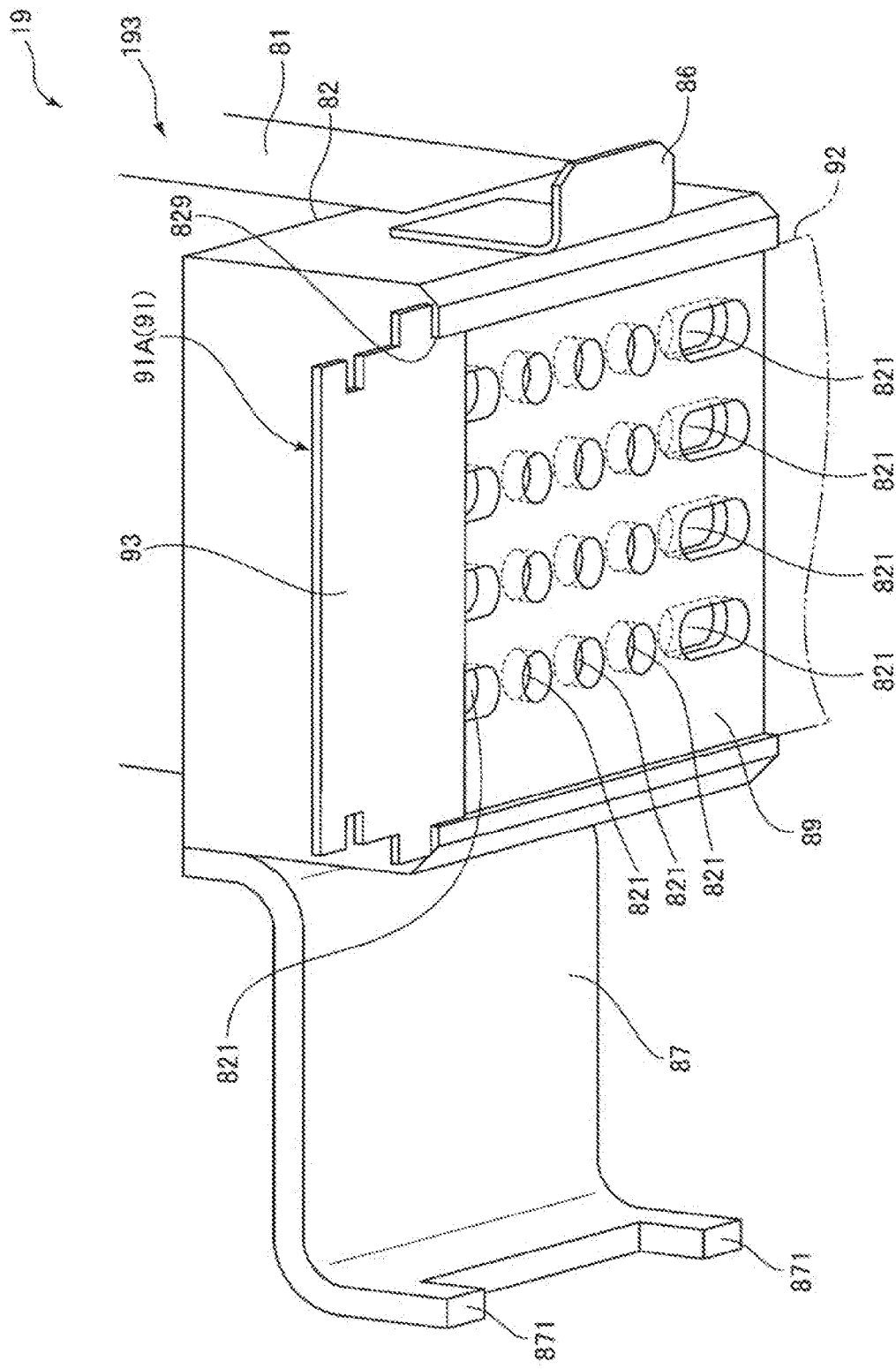
FIG. 6 is an exploded view of the area [A] surrounded by the dashed-dotted line in FIG. 4.
Figure 7:
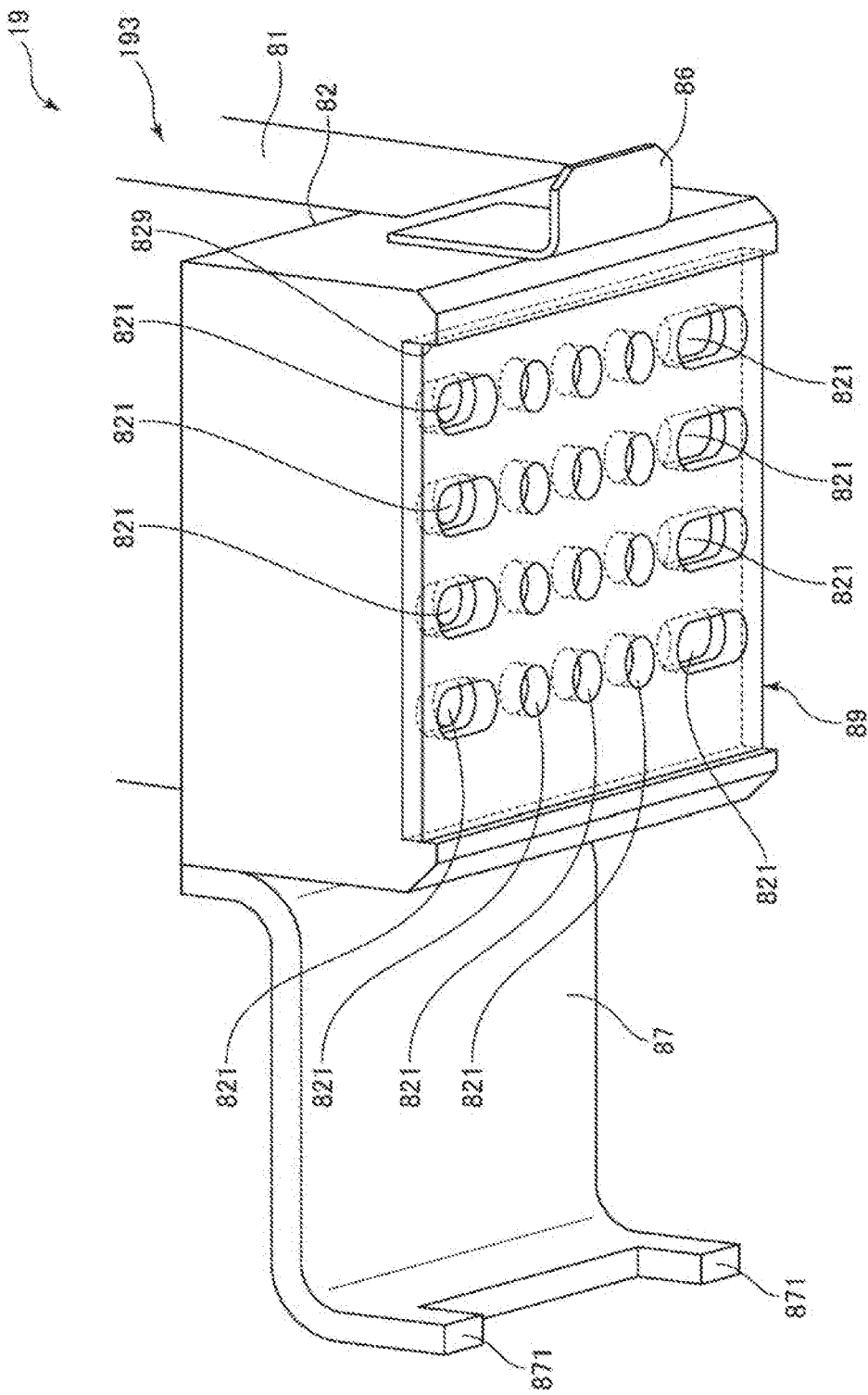
FIG. 7 is an exploded view of the area [A] surrounded by the dashed-dotted line in FIG. 4.
Figure 8:
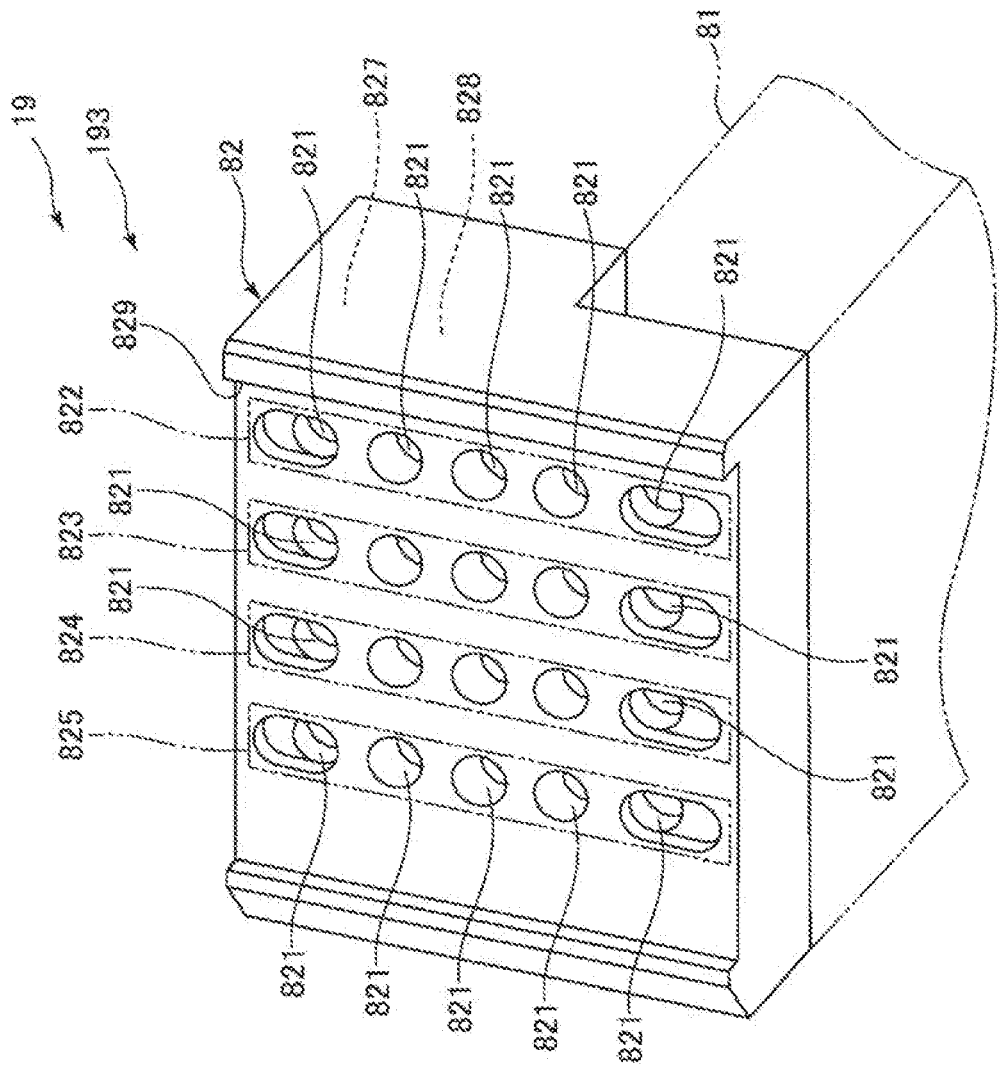
FIG. 8 is a perspective view of a suction block provided in the end effector shown in FIG. 4.
Figure 9:
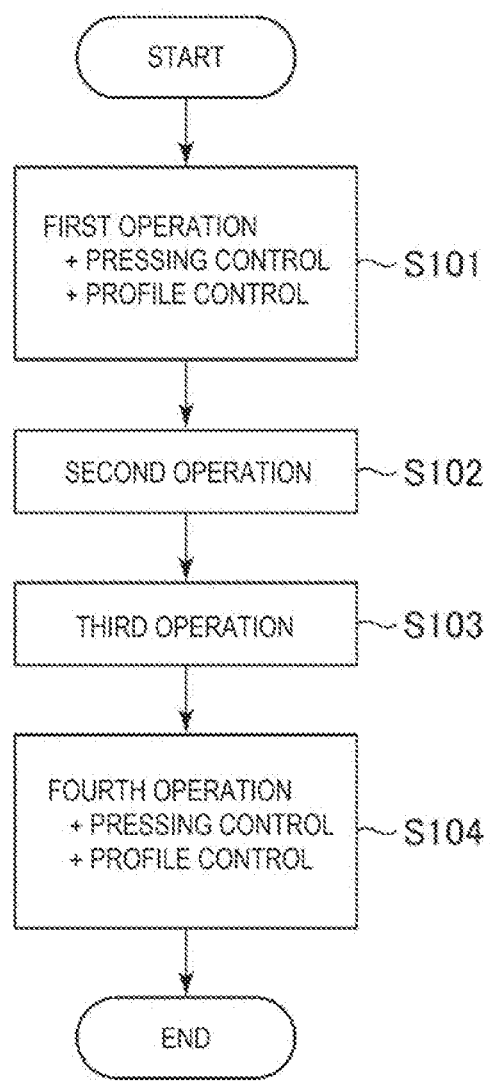
FIG. 9 is a flowchart showing a control operation of a robot control apparatus in the first embodiment of the robot system according to the present disclosure.
Figure 10:
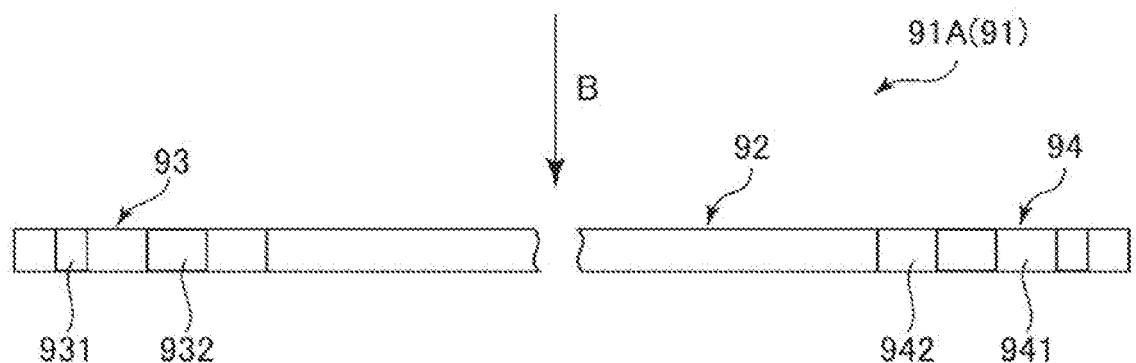
FIG. 10 is a side view showing a cable as a work object in the first embodiment of the robot system according to the present disclosure.
Figure 11:
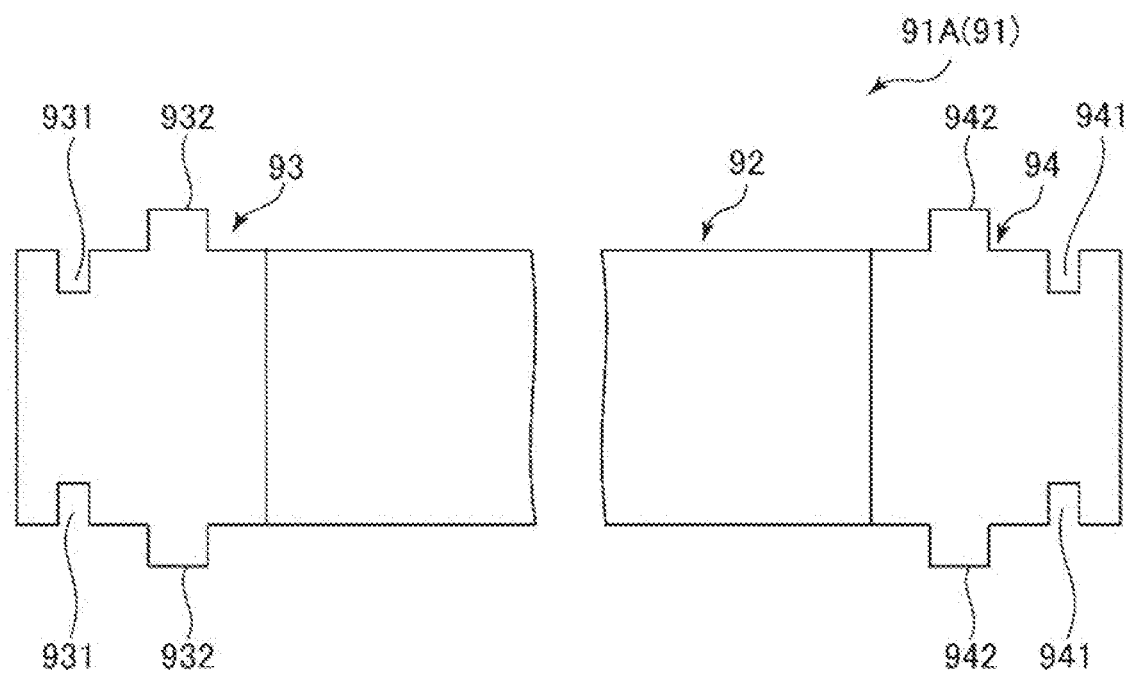
FIG. 11 is a view (plan view) as seen from a direction of an arrow B in FIG. 10.
Figure 12:
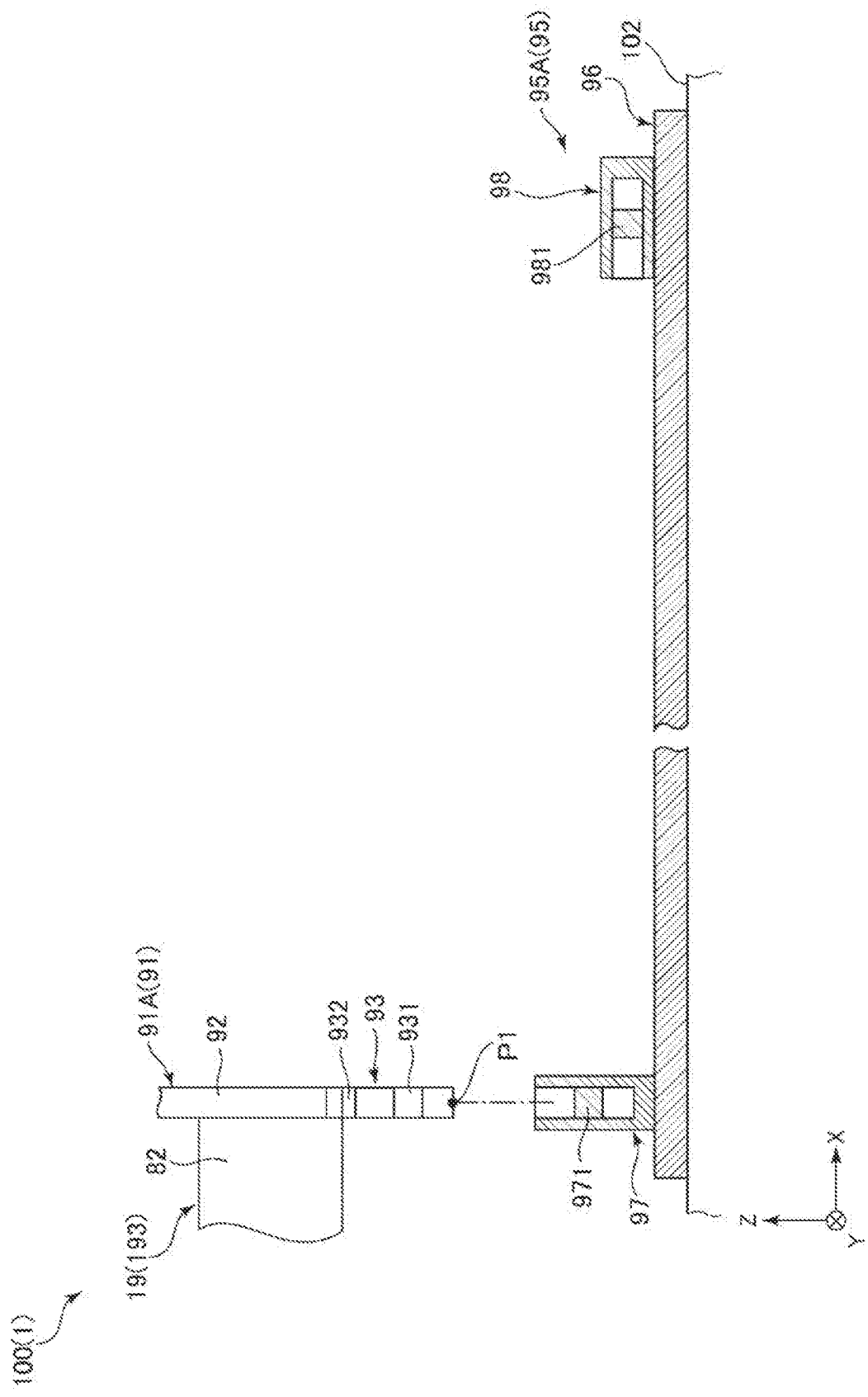
FIG. 12 is a partial vertical sectional view for sequential explanation of work in the first embodiment of the robot system according to the present disclosure.
Figure 13:
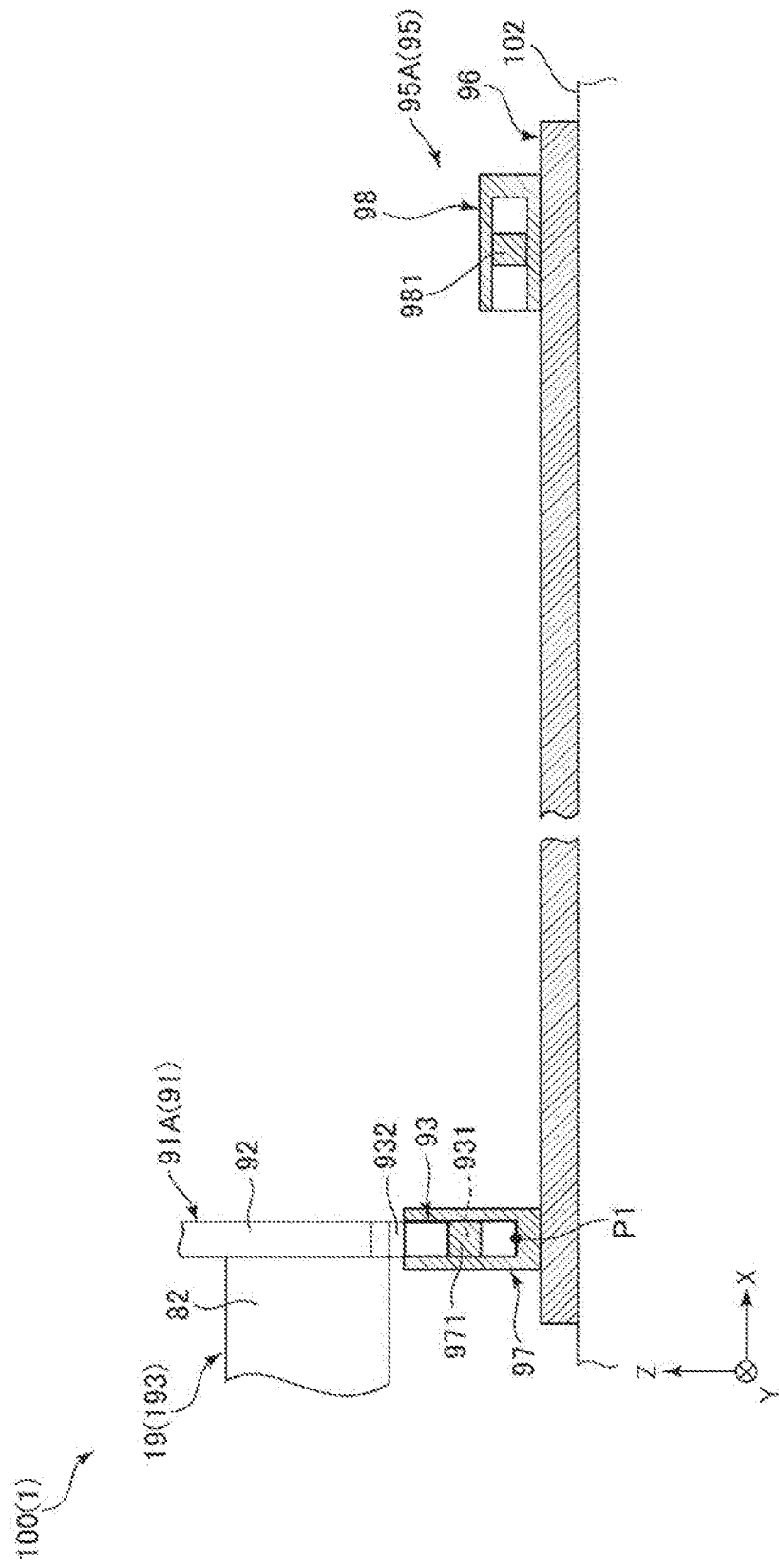
FIG. 13 is a partial vertical sectional view for sequential explanation of the work in the first embodiment of the robot system according to the present disclosure.
Figure 14:
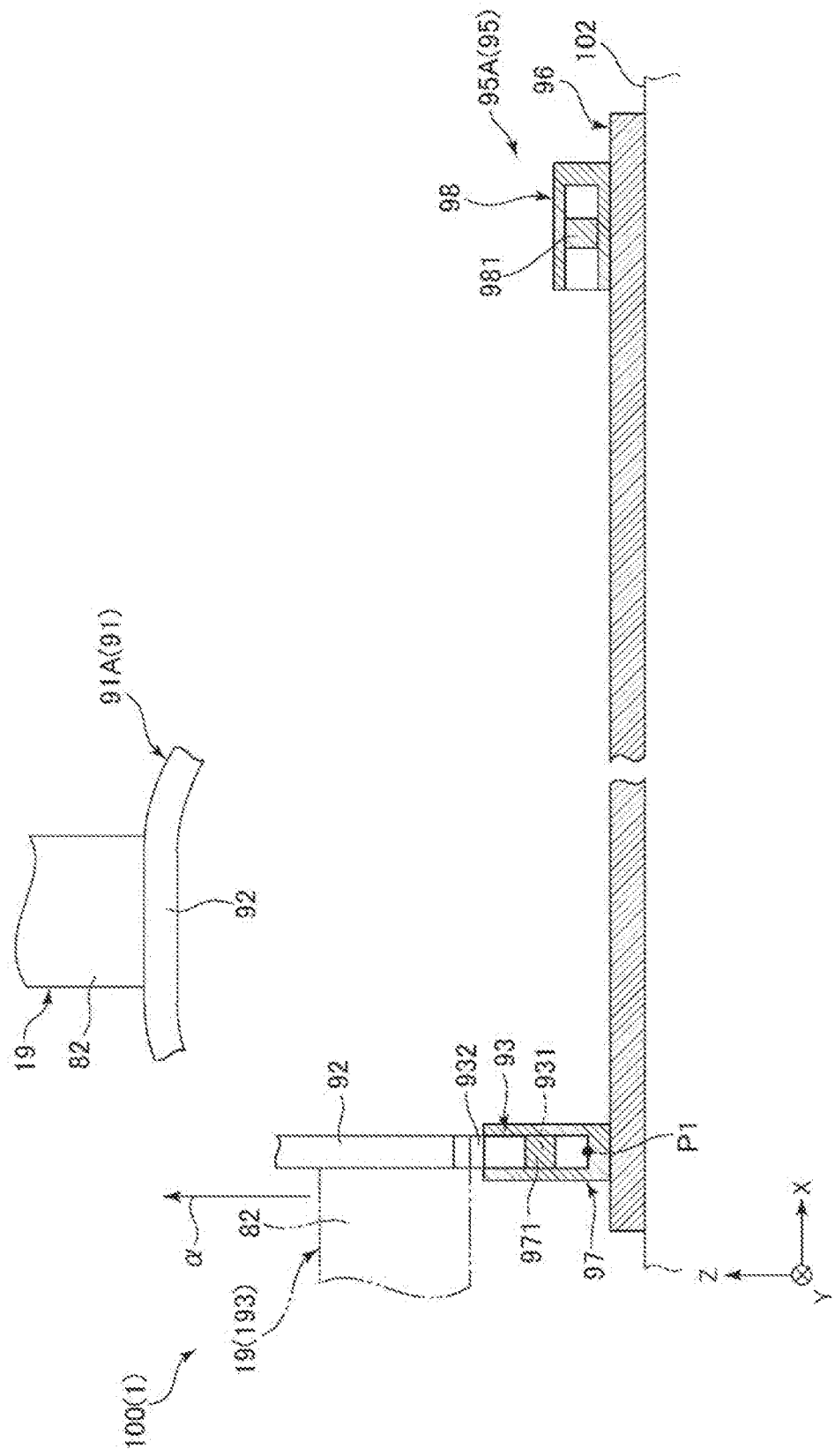
FIG. 14 is a partial vertical sectional view for sequential explanation of the work in the first embodiment of the robot system according to the present disclosure.
Figure 15:
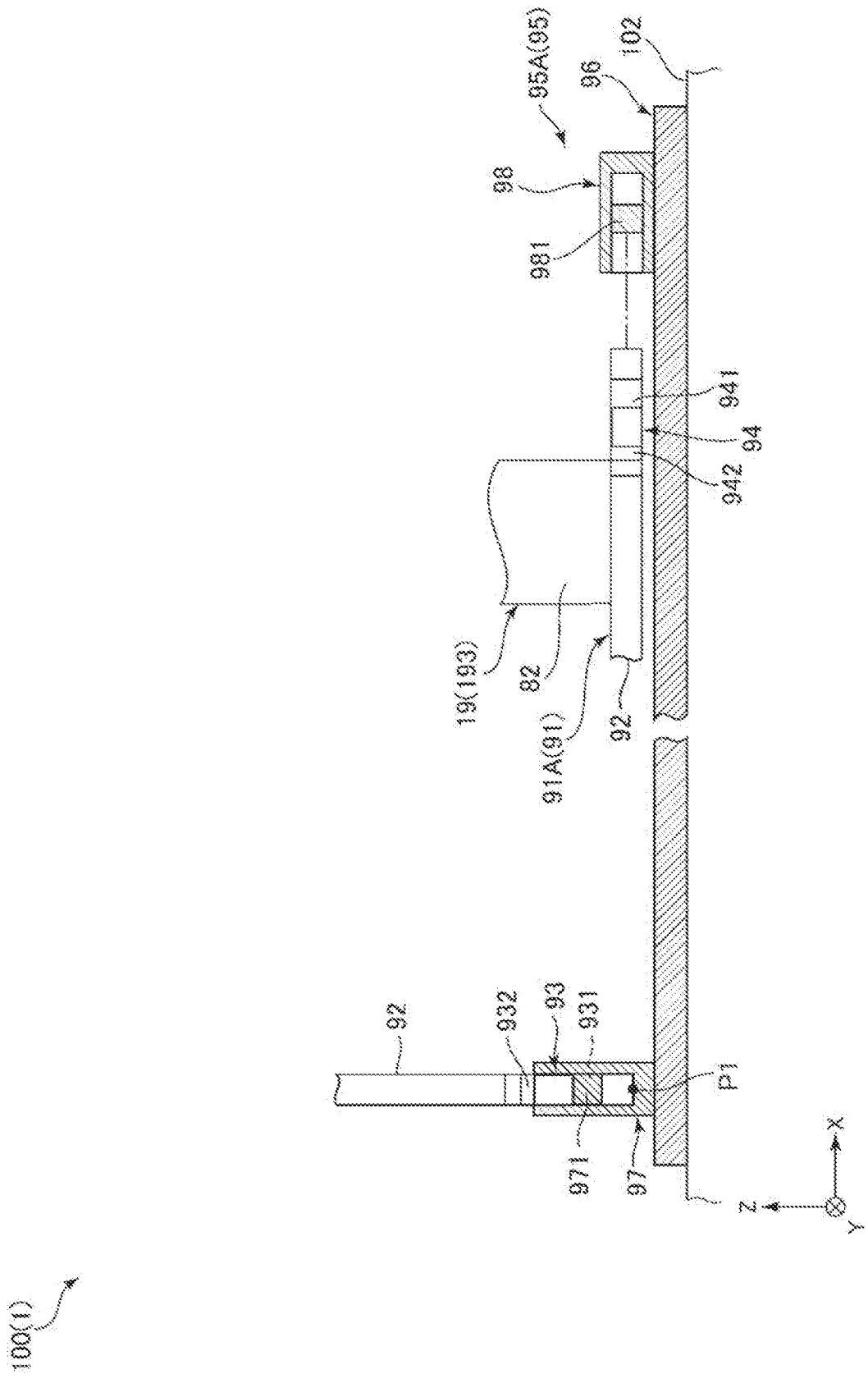
FIG. 15 is a partial vertical sectional view for sequential explanation of the work in the first embodiment of the robot system according to the present disclosure.
Figure 16:
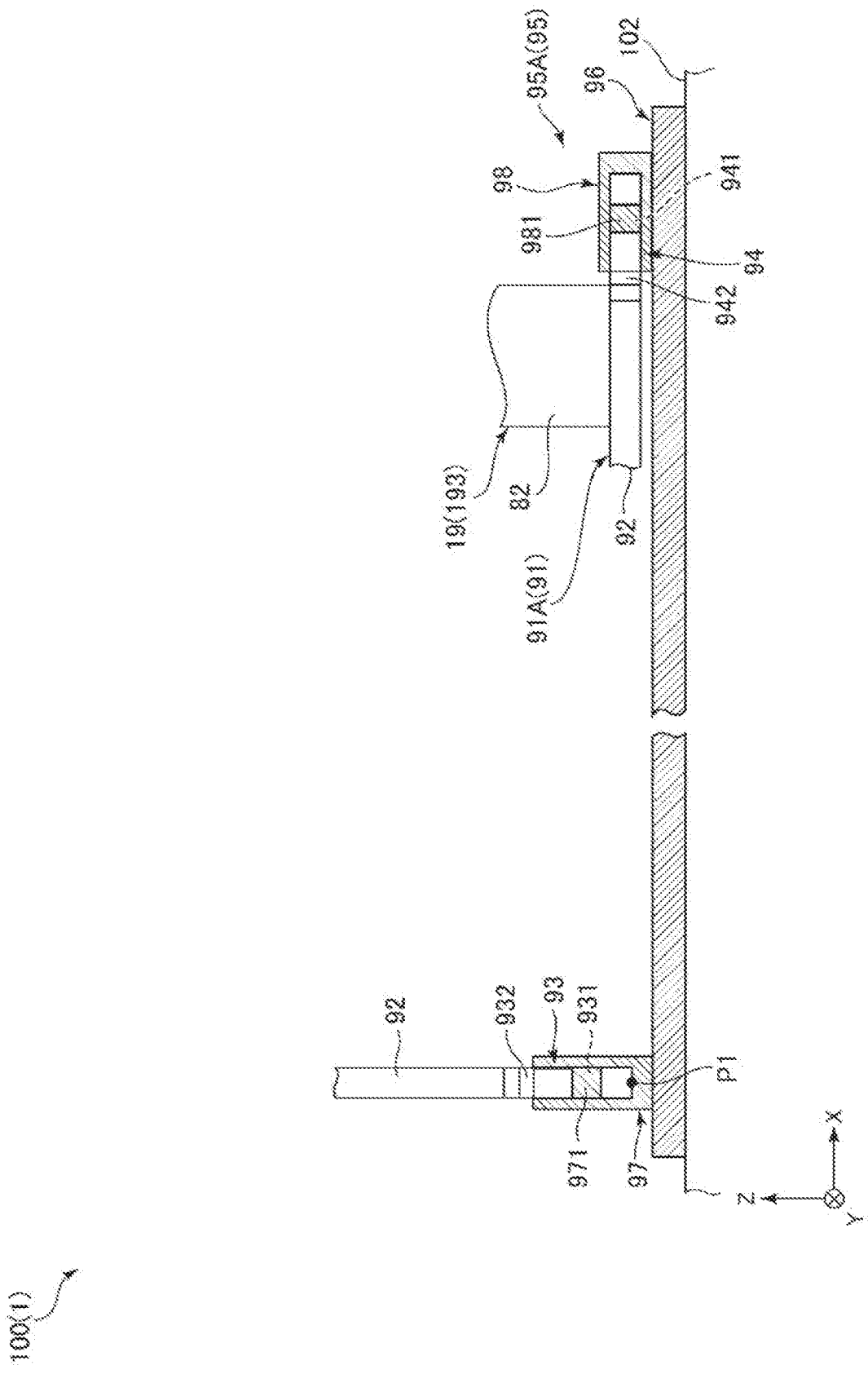
FIG. 16 is a partial vertical sectional view for sequential explanation of the work in the first embodiment of the robot system according to the present disclosure.
Figure 17:
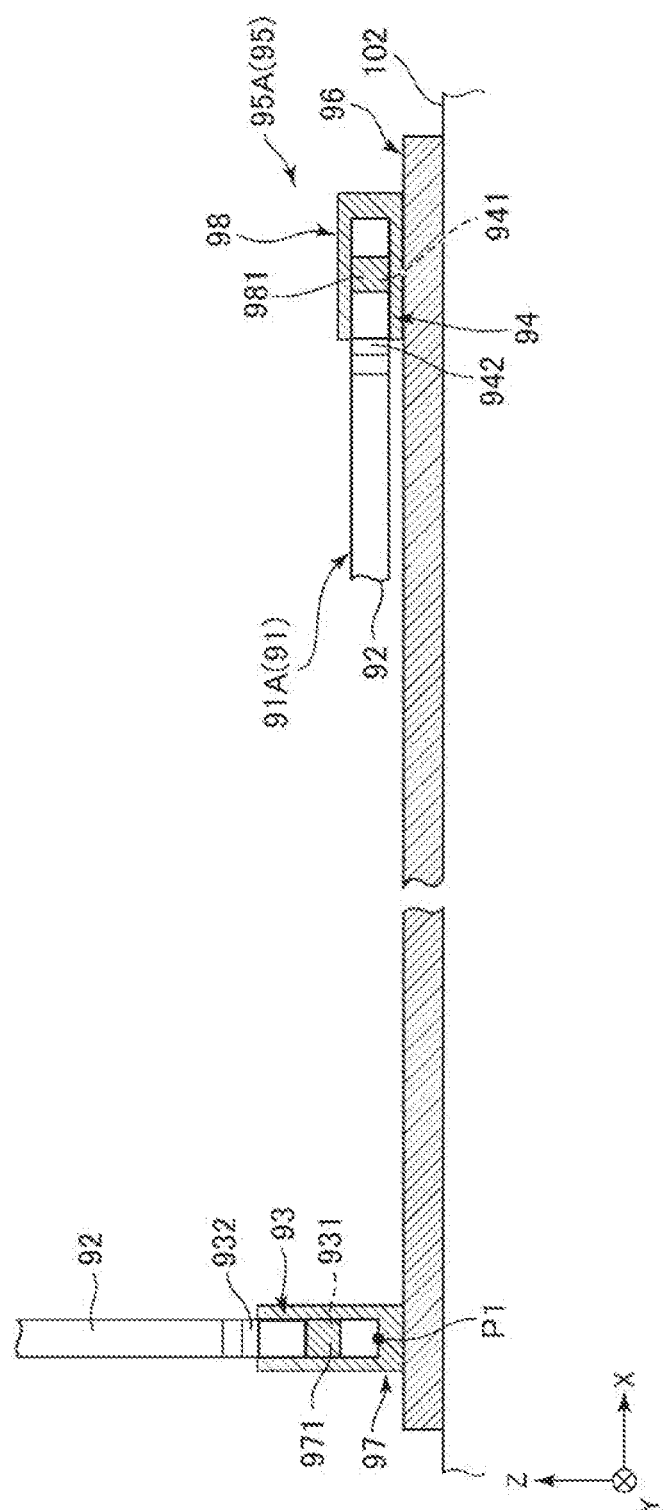
FIG. 17 is a partial vertical sectional view for sequential explanation of the work in the first embodiment of the robot system according to the present disclosure.
Figure 18:
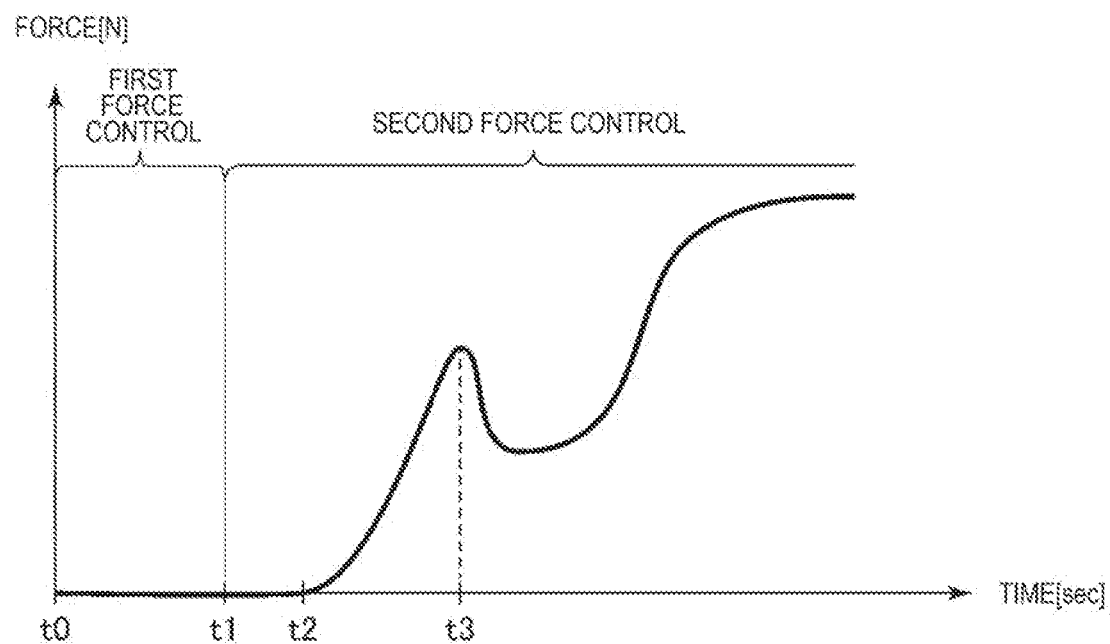
FIG. 18 is a graph (example) of temporal change of a force detected by a force detection unit in the process of the work shown in FIGS. 12 and 13, which shows a successful case of the work.

FIG. 1 is the perspective view (including the block diagram) showing the robot in the first embodiment of the robot system according to the present disclosure. FIG. 2 is the schematic diagram of the robot shown in FIG. 1. FIG. 3 is the block diagram showing the main part of the first embodiment of the robot system according to the present disclosure. FIG. 4 is the perspective view showing the end effector to be attached to the robot shown in FIG. 1. FIG. 5 is an enlarged view of the area [A] surrounded by the dashed-dotted line in FIG. 4. FIG. 6 is the exploded view of the area [A] surrounded by the dashed-dotted line in FIG. 4. FIG. 7 is the exploded view of the area [A] surrounded by the dashed-dotted line in FIG. 4. FIG. 8 is the perspective view of the suction block provided in the end effector shown in FIG. 4. FIG. 9 is the flowchart showing the control operation of the robot control apparatus in the first embodiment of the robot system according to the present disclosure. FIG. 10 is the side view showing the cable as the work object in the first embodiment of the robot system according to the present disclosure. FIG. 11 is the view (plan view) as seen from the direction of the arrow B in FIG. 10. FIG. 12 is the partial vertical sectional view for sequential explanation of work in the first embodiment of the robot system according to the present disclosure. FIG. 13 is the partial vertical sectional view for sequential explanation of the work in the first embodiment of the robot system according to the present disclosure. FIG. 14 is the partial vertical sectional view for sequential explanation of the work in the first embodiment of the robot system according to the present disclosure. FIG. 15 is the partial vertical sectional view for sequential explanation of the work in the first embodiment of the robot system according to the present disclosure. FIG. 16 is the partial vertical sectional view for sequential explanation of the work in the first embodiment of the robot system according to the present disclosure. FIG. 17 is the partial vertical sectional view for sequential explanation of the work in the first embodiment of the robot system according to the present disclosure. FIG. 18 is the graph (example) of temporal change of the force detected by the force detection unit in the process of the work shown in FIGS. 12 and 13, which shows the successful case of the work.

In FIG. 1, the end effector is schematically shown. Further, in FIG. 2, illustration of the end effector and the force detection unit is omitted.

Hereinafter, for convenience of explanation, the upside in FIGS. 1, 2, 4 to 7, 12 to 17 may be referred to as "up" or "upper" and the downside may be referred to as "low" or "lower" (the same applies to FIGS. 21 to 25). Further, upward and downward directions in FIGS. 1, 2, 4 to 7, 12 to 17 are vertical directions (the same applies to FIGS. 21 to 25).

The base side in FIGS. 1 and 2 may be referred to as "proximal end" or "upstream" and the opposite side may be referred to as "distal end" or "downstream".

In this specification, "horizontal" includes not only the completely horizontal case but also inclined cases within ±5° relative to horizontal. Similarly, in this specification, "vertical" includes not only the completely vertical case but also inclined cases within ±5° relative to vertical. Further, in this specification, "parallel" includes not only the case where two lines (including axes) or surfaces are completely parallel to each other but also inclined cases within ±5°. Furthermore, in this specification, "orthogonal" includes not only the case where two lines (including axes) or surfaces are completely orthogonal to each other but also inclined cases within ±5°.

For explanation of work in the robot system, for convenience, as shown in FIGS. 12 to 17, a coordinate system formed by an X-axis, a Y-axis, and a Z-axis orthogonal to one another is provided.

A robot control apparatus (hereinafter, simply referred to as "control apparatus") 20 according to the present disclosure controls a robot 1 having a robot arm 10 to which an end effector 19 is attached, and holding a first component 91A as a cable 91 having flexibility using the end effector 19, coupling a first connector 93 of the first component 91A (one end portion of the cable 91) to a first connector 97 of a second component 95A, and inserting a second connector 94 of the first component 91A (the other end portion of the cable 91) to a second connector 98 of the second component 95A.

The control apparatus 20 allows (controls) the robot 1 to execute a first operation of holding the first connector 93 side of the first component 91A (one end portion of the cable 91 side) using the end effector 19 and inserting the first connector 93 (one end portion of the cable 91) into the first connector 97, a second operation of storing a position and a posture of a specific point P1 on the first component 91A (cable 91) or the end effector 19 when the insertion of the first connector 93 (one end portion of the cable 91) into the first connector 97 is completed after the first operation, a third operation of moving the end effector 19 along the longitudinal direction of the first component 91A (cable 91) toward the second connector 94 (the other end portion of the cable 91) side based on an amount of movement of the first component 91A toward the second connector 94 (the other end portion of the cable 91) stored in a memory unit 208 in advance and the position and the posture of the specific point P1 while holding the first component 91A (cable 91) using the end effector 19, and holding the second connector 94 (the other end portion of the cable 91) side using the end effector 19 after the second operation, and a fourth operation of inserting the second connector 94 (the other end portion of the cable 91) into the second connector 98 while holding the second connector 94 (the other end portion of the cable 91) side using the end effector 19.

According to the present disclosure, as will be described later, when the work of coupling the first connector 93 of the first component 91A to the first connector 97 of the second component 95A and coupling the second connector 94 of the first component 91A to the second connector 98 of the second component 95A, after the insertion of the first connector 93, the second connector 94 may be held based on the position in which the first connector 93 is completely inserted, and thereby, the coupling work may be performed in a shorter time.

The robot 1 according to present disclosure has a robot arm 10 and is controlled by the control apparatus (robot control apparatus) 20 according to the present disclosure.

Thereby, The robot 1 having the above described advantage of the control apparatus 20 is obtained.

A robot system 100 according to the present disclosure includes the robot 1 having the robot arm 10, and the control apparatus (robot control apparatus) 20 according to the present disclosure that controls the robot 1.

Thereby, the robot system 100 having the above described advantage of the control apparatus 20 is obtained.

The robot system 100 shown in FIGS. 1 and 3 includes the robot 1, the control apparatus 20 that controls the robot 1, a display device 5 (display unit), and an input device 9 (input unit). The uses of the robot system 100 are not particularly limited, but the system may be used in respective work of holding, carrying, assembly, inspection, etc. of works (objects) including electronic components and electronic apparatuses, for example.

The robot 1 and the control apparatus 20 are electrically coupled (hereinafter, also simply referred to as "coupled") by a cable. Further, the control apparatus 20 and the display device 5 and input device 9 are respectively electrically coupled by cables.

Note that the robot 1 and the control apparatus 20 do not necessarily communicate via wired connection, but may communicate via wireless connection without the cable, for example. Further, part or all of the control apparatus 20 may be provided inside of the robot 1.

Or, the display device 5 and the control apparatus 20 do not necessarily communicate via wired connection, but may communicate via wireless connection without the cable, for example.

Or, the input device 9 and the control apparatus 20 do not necessarily communicate via wired connection, but may communicate via wireless connection without the cable, for example.

The control apparatus 20 may be formed using e.g. a computer (PC) containing a CPU (Central Processing Unit) as an example of a processor or the like. The control apparatus 20 includes a control unit 201 that performs control etc. of driving (actuation) of a first drive source 401, a second drive source 402, a third drive source 403, a fourth drive source 404, a fifth drive source 405, a sixth drive source 406, and the end effector 19 of the robot 1, which will be described later, a determination unit 206, a receiving unit 207, the memory unit 208 (memory), and a display control unit 209.

The control unit 201 has a force control part 202 that performs force control on the robot 1, and a position control part 203 that performs position control on the robot 1. The control unit 201 has a function of controlling driving of the robot 1, i.e., driving of the robot arm 10, the end effector 19, etc. by performing the force control, position control, etc. The control unit 201 (force control part 202, position control part 203) includes e.g. a CPU (processor), a RAM, a ROM in which programs are stored, etc. Further, the function of the control unit 201 (force control part 202, position control part 203) may be realized by execution of various programs using the CPU, for example.

The display control unit 209 has a function of allowing the display device 5 to display various images (including various screens such as windows), characters, etc. That is, the display control unit 209 has a function of controlling driving of the display device 5. The function of the display control unit 209 may be realized using e.g. a GPU (processor), CPU (processor), or the like.

The memory unit 208 has a function of storing various kinds of information (including data, programs, etc.). The function of the memory unit 208 may be realized using e.g. a semiconductor memory such as a RAM or ROM, hard disc device, external memory device, or the like.

The determination unit 206 has a function of performing respective determinations. The function of the determination unit 206 may be realized using e.g. a CPU (processor) or the like.

The receiving unit 207 has a function of receiving input from the input device 9. The function of the receiving unit 207 may be realized using e.g. an interface circuit. Note that, for example, when a touch panel is used, the receiving unit 207 has a function as an input sensing unit that senses contact of a finger of a user with the touch panel or the like.

The display device 5 includes a monitor (not shown) of e.g. a liquid crystal display, EL display, or the like, and displays various images (including various screens such as windows), characters, etc.

The input device 9 may include e.g. a mouse, keyboard, etc. The user may give instructions (input) for various kinds of processing etc. to the control apparatus 20 by operating the input device 9.

Specifically, the user may give instructions to the control apparatus 20 by operations of clicking with the mouse of the input device 9 on various screens (windows or the like) displayed on the display device 5 and operations of inputting characters, numerals, etc. with the keyboard of the input device 9. Hereinafter, the instructions given using the input device 9 by the user (input using the input device 9) are also referred to as "operation instructions". The operation instructions include a selection operation of selecting a desired content from contents displayed on the display device 5 with the input device 9, an input instruction of inputting characters, numerals, etc. with the input device 9, etc. Further, the input includes selection.

Note that, in the embodiment, in place of the display device 5 and the input device 9, a display input device (not shown) serving as both the display device 5 and the input device 9 (display unit and input unit) may be provided. As the display input device, e.g. a touch panel (electrostatic touch panel, pressure-sensitive touch panel) or the like may be used. Or, the input device 9 may recognize sound (including voice).

As shown in FIGS. 1 and 2, the robot 1 includes the base 11 and the robot arm 10. The robot arm 10 includes a first arm 12, a second arm 13, a third arm 14, a fourth arm 15, a fifth arm 17, and a sixth arm 18, and the first drive source 401, the second drive source 402, the third drive source 403, the fourth drive source 404, the fifth drive source 405, and the sixth drive source 406. Further, a wrist 16 is formed by the fifth arm 17 and the sixth arm 18 and, for example, the end effector 19 such as a hand may be detachably attached to (worn on) the distal end of the sixth arm 18, and the cable 91 is held (gripped) by the end effector 19. The cable 91 held by the end effector 19 is not particularly limited to, but includes various objects such as electronic components and electronic apparatuses.

Here, "the end effector 19 is attached (coupled) to the robot arm 10 (sixth arm 18)" is not limited to the case where the end effector 19 is directly attached to the robot arm 10, but includes cases where the end effector 19 is indirectly attached to the robot arm 10 such as the case where the end effector 19 is attached to the force detection unit 7 as in the embodiment.

In the embodiment, the force detection unit 7 (force sensor) is detachably attached (coupled) to the distal end of the sixth arm 18 of the robot arm 10, and the end effector 19 is detachably attached (coupled) to the force detection unit 7. That is, the force detection unit 7 is provided between the sixth arm 18 and the end effector 19. Further, the robot arm 10, the force detection unit 7, and the end effector 19 form a movable section 30.

Note that the force detection unit 7 is detachably coupled to the sixth arm 18 and the end effector 19 is detachably coupled to the force detection unit 7, however, for example, the force detection unit 7 may be undetachably provided or the end effector 19 may be undetachably provided.

The force detection unit 7 detects forces (including translational forces and torque) applied to the end effector 19. The force detection unit 7 is not particularly limited, but, in the embodiment, a six-axis force sensor that can detect force components in the respective axial directions of the three axes orthogonal to one another (translational force components) and force components about the respective three axes (torque components) or the like is used. Note that the force detection unit 7 may have another configuration.

The robot 1 is a single-arm six-axis vertical articulated robot in which the base 11, the first arm 12, the second arm 13, the third arm 14, the fourth arm 15, the fifth arm 17, and the sixth arm 18 are sequentially coupled from the proximal end side toward the distal end side. Hereinafter, the first arm 12, the second arm 13, the third arm 14, the fourth arm 15, the fifth arm 17, the sixth arm 18, and the wrist 16 are respectively also referred to as "arm". The first drive source 401, the second drive source 402, the third drive source 403, the fourth drive source 404, the fifth drive source 405, and the sixth drive source 406 are respectively also referred to as "drive source". Note that the lengths of the first arm 12, the second arm 13, the third arm 14, the fourth arm 15, the fifth arm 17, and the sixth arm 18 are respectively not particularly limited, but can be appropriately set.

The base 11 and the first arm 12 are coupled via a joint 171. The first arm 12 is pivotable with a first pivot axis O1 parallel to the vertical direction as a pivot center on the first pivot axis O1 relative to the base 11. The first pivot axis O1 coincides with the normal of the upper surface of a floor 101 as an installation surface of the base 11. The first pivot axis O1 is a pivot axis at the most upstream of the robot 1. The first arm 12 pivots by driving of the first drive source 401 having a motor (first motor) 401M and a reducer (not shown). Further, the motor 401M is controlled by the control apparatus 20 via a motor driver 301. Note that the reducer may be omitted.

The first arm 12 and the second arm 13 are coupled via a joint 172. The second arm 13 is pivotable with a second pivot axis O2 parallel to the horizontal direction as a pivot center relative to the first arm 12. The second pivot axis O2 is parallel to an axis orthogonal to the first pivot axis O1. The second arm 13 pivots by driving of the second drive source 402 having a motor (second motor) 402M and a reducer (not shown). Further, the motor 402M is controlled by the control apparatus 20 via a motor driver 302. Note that the reducer may be omitted. The second pivot axis O2 may be orthogonal to the first pivot axis O1.

The second arm 13 and the third arm 14 are coupled via a joint 173. The third arm 14 is pivotable with a third pivot axis P3 parallel to the horizontal direction as a pivot center on the third pivot axis O3 relative to the second arm 13. The third pivot axis O3 is parallel to the second pivot axis O2. The third arm 14 pivots by driving of the third drive source 403 having a motor (third motor) 403M and a reducer (not shown). Further, the motor 403M is controlled by the control apparatus 20 via a motor driver 303. Note that the reducer may be omitted.

The third arm 14 and the fourth arm 15 are coupled via a joint 174. The fourth arm 15 is pivotable with a fourth pivot axis O4 parallel to the center axis direction of the third arm 14 on the fourth pivot axis O4 relative to the third arm 14. The fourth pivot axis O4 is orthogonal to the third pivot axis O3. The fourth arm 15 pivots by driving of the fourth drive source 404 having a motor (fourth motor) 404M and a reducer (not shown). Further, the motor 404M is controlled by the control apparatus 20 via a motor driver 304. Note that the reducer may be omitted. The fourth pivot axis O4 may be parallel to an axis orthogonal to the third pivot axis O3.

The fourth arm 15 and the fifth arm 17 of the wrist 16 are coupled via a joint 175. The fifth arm 17 is pivotable with a fifth pivot axis O5 as a pivot center on the fifth pivot axis O5 relative to the fourth arm 15. The fifth pivot axis O5 is orthogonal to the fourth pivot axis O4. The fifth arm 17 pivots by driving of the fifth drive source 405 having a motor (fifth motor) 405M and a reducer (not shown). Further, the motor 405M is controlled by the control apparatus 20 via a motor driver 305. Note that the reducer may be omitted. The fifth pivot axis O5 may be parallel to an axis orthogonal to the fourth pivot axis O4.

The fifth arm 17 and the sixth arm 18 of the wrist 16 are coupled via a joint 176. The sixth arm 18 is pivotable with a sixth pivot axis O6 as a pivot center on the sixth pivot axis O6 relative to the fifth arm 17. The sixth pivot axis O6 is orthogonal to the fifth pivot axis O5. The sixth arm 18 pivots by driving of the sixth drive source 406 having a motor (sixth motor) 406M and a reducer (not shown). Further, the motor 406M is controlled by the control apparatus 20 via a motor driver 306. Note that the reducer may be omitted. The sixth pivot axis O6 may be parallel to an axis orthogonal to the fifth pivot axis O5.

In the first drive source 401 to sixth drive source 406, a first angle sensor 411, a second angle sensor 412, a third angle sensor 413, a fourth angle sensor 414, a fifth angle sensor 415, and a sixth angle sensor 416 are provided in the respective motors or reducers. Hereinafter, the first angle sensor 411, the second angle sensor 412, the third angle sensor 413, the fourth angle sensor 414, the fifth angle sensor 415, and the sixth angle sensor 416 are respectively also referred to as "angle sensor". These angle sensors are not particularly limited, but e.g. encoders such as rotary encoders may be used. Using these first angle sensor 411 to sixth angle sensor 416, rotation (pivot) angles of the rotation shafts (pivot shafts) of the motors or reducers of the first drive source 401 to sixth drive source 406 may be detected.

The motors of the first drive source 401 to sixth drive source 406 are not respectively particularly limited, but e.g. servo motors such as AC servo motors or DC servo motor may be preferably used.

The robot 1 is electrically coupled to the control apparatus 20. That is, the first drive source 401 to sixth drive source 406 and the first angle sensor 411 to sixth angle sensor 416 are respectively electrically coupled to the control apparatus 20.

The control apparatus 20 may respectively independently actuate the first arm 12 to fourth arm 15 and the wrist 16, that is, may respectively independently control the first drive source 401 to sixth drive source 406 via the motor driver 301 to motor driver 306. In this case, the control apparatus 20 performs detection using the first angle sensor 411 to sixth angle sensor 416 and the force detection unit 7, and respectively controls driving of the first drive source 401 to sixth drive source 406 e.g. angular velocities, rotation angles, etc. based on the detection results (detection information). The control program is stored in advance in the memory unit 208 of the control apparatus 20.

In the embodiment, the base 11 is a part located in the lowermost position of the robot 1 in the vertical direction and fixed (installed) to the floor 101 or the like of the installation space. The fixing method is not particularly limited, but, for example, in the embodiment, a fixing method using a plurality of bolts 111 is used. The floor 101 of the part to which the base 11 is fixed is a plane (surface) parallel to the horizontal plane, but not limited to that.

In the base 11, for example, the motor 401M, the motor driver 301 to motor driver 306, etc. are housed. Note that the motor driver 301 to motor driver 306 may be provided in the control apparatus 20.

The first arm 12 to fourth arm 15 respectively have hollow arm main bodies 2, drive mechanisms 3 housed in the arm main bodies 2 and including motors, and sealing units 4 that seal the interiors of the arm main bodies 2. Note that, in the drawing, the arm main body 2, the drive mechanism 3, and the sealing unit 4 of the first arm 12 are also referred to as "2a", "3a", "4a", respectively, the arm main body 2, the drive mechanism 3, and the sealing unit 4 of the second arm 13 are also referred to as "2b", "3b", "4b", respectively, the arm main body 2, the drive mechanism 3, and the sealing unit 4 of the third arm 14 are also referred to as "2c", "3c", "4c", respectively, and the drive mechanism 3, and the sealing unit 4 of the fourth arm 15 are also referred to as "2d", "3d", "4d", respectively.

Next, the basis of the control in the robot system 100 is explained.

In the work, the control apparatus 20 controls driving (operation) of the robot 1 by position control, force control, or the like based on the output of the first angle sensor 411 to sixth angle sensor 416 and the force detection unit 7, i.e., the detection results (detected angles) of the first angle sensor 411 to sixth angle sensor 416, the detection results (detected forces) of the force detection unit 7, etc.

The position control is control for the operation of the robot 1 of moving the end effector 19 to a target position in a target posture based on information on the position and the posture of the end effector 19 of the robot 1. In place of the end effector 19, the distal end portion of the robot arm 10, the cable 91 gripped by the end effector 19, or the like may be used. The information on the position and the posture of the end effector 19 can be obtained based on the detection results of the first angle sensor 411 to sixth angle sensor 416 etc.

Further, the force control is control for the operation of the robot 1 of changing the position and the posture of the end effector 19 and pushing, pulling, and rotating the end effector 19 based on the detection results of the force detection unit 7. The force control includes e.g. impedance control and force trigger control.

In the force trigger control, detection is performed using the force detection unit 7 and the robot arm 10 is moved (including change in posture), i.e., operated until a predetermined force is detected by the force detection unit 7.

The impedance control includes profile control. First, briefly, in the impedance control, the operation of the robot arm 10 (robot 1) is controlled to maintain the force applied to the distal end portion of the robot arm 10 at a predetermined force as far as possible, that is, maintain a force in a predetermined direction detected by the force detection unit 7 at a target value (including zero) as far as possible. Thereby, for example, when the impedance control is performed on the robot arm 10, the robot arm 10 performs an operation of allowing the cable 91 gripped by the end effector 19 to trace another object 95 with respect to the predetermined direction.

More specifically, the model of the impedance control of the robot 1 is expressed by the following equation of motion (A).

$$f(t) = mx'' + cx' + kx \quad (A)$$

In the equation (A), m is a mass (inertial), c is a coefficient of viscosity, k is a modulus of elasticity (rigidity), f(t) is a force, x is displacement (position) from a target position. Further, the first derivative of x, i.e., x' corresponds to a velocity, the second derivative of x, i.e., x" corresponds to an acceleration. Hereinafter, m, c, and k are respectively also simply referred to as "parameter".

In the impedance control, a control system for providing the characteristics of the equation (A) to the distal end portion of the robot arm 10 is formed. That is, the control is performed as if the distal end portion of the robot arm 10 had a virtual mass, a virtual coefficient of viscosity, and a virtual modulus of elasticity expressed by the equation (A).

Further, the respective parameters m, c, and k in the equation (A) are not particularly limited, but appropriately set based on various conditions. That is, the respective parameters m, c, and k are set to values convenient for the work performed by the robot 1.

As shown in FIG. 4, the end effector 19 includes a supporting board 191, a first suction unit 192 supported by the supporting board 191, and a second suction unit 193 supported in a different position of the supporting board 191 from that of the first suction unit.

The supporting board 191 is formed by a member having a plate-like shape. The end portion of the supporting board 191 on the left in FIG. 4 is cantilevered by the force detection unit 7, and the first suction unit 192 is supported on the free end side (right side in FIG. 4) and the second suction unit 193 is supported on the fixed end side (left side in FIG. 4). Further, a joint 194 is coupled to the supporting board 191.

The first suction unit 192 is a unit that holds (grips) the cable 91 by suction. The first suction unit 192 has a base part 71 having an elongated plate shape, a joint 72 coupled to the side surface of the base part 71, a joint 73 coupled to the lower surface of the base part 71, a joint 74 coupled to the side surface of the base part 71, a suction pad 75 coupled to the joint 72, and a suction pad 76 coupled to the joint 73.

The base part 71 is placed along the leftward and rightward directions in FIG. 4 and fixed to the lower surface of the supporting board 191 via e.g. bolts.

The joint 72 and the joint 73 are placed apart along the longitudinal direction of the base part 71, i.e., the leftward and rightward directions in FIG. 4. The suction pad 75 is coupled to the joint 72 to face downward, and the suction pad 76 is coupled to the joint 73 to face downward.

Further, the joint 72 and the joint 73 communicate with the joint 74 via a hollow part (channel) 711 formed inside of the base part 71. The joint 74 is coupled to e.g. an ejector (hereinafter, referred to as "first ejector") (not shown). The first ejector is actuated, and thereby, attractive forces for suctioning the cable 91 may be generated in the suction pad 75 and the suction pad 76. By vacuum break in the first ejector, the attractive forces are lost and the suction for the cable 91 may be released.

The second suction unit 193 is a unit that holds (grips) the cable 91 that has been held by the first suction unit 192 and carried to a predetermined location by suction. The second suction unit 193 has a base part 81 having a plate shape, a suction block 82 supported by the lower portion of the base part 81, a joint 83 coupled to the suction block 82, a joint 84 coupled to a position of the suction block 82 different from that of the joint 83, a supporting plate 85 placed to cover the lower surface of the suction block 82, a first engagement member 86 fixed to the right side surface in FIG. 4 of the suction block 82, and a second engagement member 87 fixed to the left side surface in FIG. 4 of the suction block 82.

The base part 81 is fixed to the lower surface of the supporting board 191 on the opposite side to the base part 71 of the first suction unit 192 via e.g. bolts.

The suction block 82 is fixed to the lower portion of the base part 81 via e.g. bolts. As shown in FIG. 8, the suction block 82 is formed with a plurality of suction holes 821 opening in the lower surface thereof. These suction holes 821 are arranged in a matrix form and, in the configuration shown in FIG. 8, arranged in four rows in the leftward and rightward directions in the drawing and five columns in the upward and downward directions in the drawing. Hereinafter, the five suction holes 821 in the rightmost column in FIG. 8 are referred to as "first suction hole group 822", and the other suction holes are referred to as "second suction hole group 823", "third suction hole group 824", and "fourth suction hole group 824" sequentially from the first suction hole group 822 toward the left. The respective suction holes 821 of the first suction hole group 822 and the respective suction holes 821 of the second suction hole group 823 communicate with the joint 83 via a hollow part (channel) 827 formed inside of the suction block 82. Further, the respective suction holes 821 of the third suction hole group 824 and the respective suction holes 821 of the fourth suction hole group 824 communicate with the joint 84 via a hollow part (channel) 828 formed inside of the suction block 82. Note that the respective suction holes 821 have circular shapes and the diameters thereof are preferably from 1 mm to 5 mm and more preferably from 2 mm to 4 mm, for example.

The joint 83 is coupled to e.g. an ejector (hereinafter, referred to as "second ejector") (not shown). The second ejector is actuated, and thereby, attractive forces for suctioning the cable 91 may be generated in the respective suction holes 821 of the first suction hole group 822 and the respective suction holes 821 of the second suction hole group 823. By vacuum break in the second ejector, the attractive forces are lost and the suction for the cable 91 may be released.

Like the joint 83, the joint 84 is coupled to e.g. an ejector (hereinafter, referred to as "third ejector") (not shown). The third ejector is actuated, and thereby, attractive forces for suctioning the cable 91 may be generated in the respective suction holes 821 of the third suction hole group 824 and the respective suction holes 821 of the fourth suction hole group 825. By vacuum break in the third ejector, the attractive forces are lost and suction for the cable 91 may be released.

The suction block 82 having the above described configuration may suction the cable 91 and maintain the suction state using the first suction hole group 822 and the second suction hole group 823, for example, when the cable 91 is thinner, that is, has a smaller width. Or, the suction block 82 may suction the cable 91 and maintain the suction state using the first suction hole group 822 to fourth suction hole group 825, for example, when the cable 91 is thicker, that is, has a larger width. In either case, unintended deformation of the suctioned cable 91 may be prevented.

A contact part 829 with which the cable 91 to be in contact is formed to project from the edge portion of the lower surface of the suction block 82. The suctioned cable 91 comes into contact with the contact part 829, and thereby, displacement of the cable 91 may be prevented in the work by the robot 1.

As shown in FIGS. 6 and 7, an elastic sheet 89 is fixed to the lower surface of the suction block 82. Note that the elastic sheet 89 has opening portions corresponding to the respective suction holes 821 to prevent closure of the respective suction holes 821. The elastic sheet 89 is formed using a low-friction material such as polyurethane, and may prevent displacement (sliding) of the suctioned cable 91 in the work by the robot 1 together with the contact part 829.

FIG. 6 shows the state in which the supporting plate 85 is omitted (separated, removed) from the state shown in FIG. 5. Further, FIG. 7 shows the state in which the cable 91 is omitted (separated, removed) from the state shown in FIG. 6.

As shown in FIG. 5, the supporting plate 85 is placed to face the elastic sheet 89 via a gap and, when the cable 91 is inserted between the elastic sheet 89 and the plate, supports the suctioned cable 91 from below. Thereby, the suctioned cable 91 may be prevented from dropping off the suction block 82 (second suction unit 193). Further, an inclined portion 851 inclined relative to the insertion direction (rightward direction in FIG. 5) of the cable 91 is formed in the edge portion of the supporting plate 85 on the left side in FIG. 5. Thereby, when the cable 91 is inserted between the supporting plate 85 and the elastic sheet 89, the insertion may be easily performed.

As shown in FIG. 4, the first engagement member is provided to project toward the right side in the drawing. The function, i.e., the usage of the first engagement member 86 will be explained later in the fourth embodiment.

The second engagement member 87 is provided to project toward the left side in the drawing. Further, the second engagement member 87 has hook portions 871 projecting downward. The function, i.e., the usage of the second engagement member 87 will be explained later in the fourth embodiment.

The cable 91 held by the end effector 19 having the above described configuration is not particularly limited to, but includes various objects such as electronic components and electronic apparatuses. In the embodiment, the cable is an FPC (Flexible Printed Circuits) or FFC (Flexible Flat Cable)

in an elongated shape having flexibility. Hereinafter, the cable 91 is referred to as "first component 91A".

As shown in FIGS. 10 and 11, the first component 91A as the cable 91 has a wiring part 92 having a belt shape, the first connector (first male connector) 93 provided in one end portion of the wiring part 92 (in the left end portion in the drawings) and the second connector (second male connector) 94 provided in the other end portion of the wiring part 92 (in the right end portion in the drawings).

The wiring part 92 has a plurality of wires (not shown) placed inside and having conductivity.

The first connector 93 has terminals (not shown) placed inside and coupled to the respective wires of the wiring part 92. The first connector 93 has a plate-like shape and concave portions (deficient portions) 931 are respectively formed on both sides in the width direction of the first component 91A. Further, in the first connector 93, convex portions 932 are formed in the parts closer to the wiring part 92 side than the concave portions 931. The convex portions 932 are respectively formed on both sides in the width direction of the first component 91A.

The second connector 94 has terminals (not shown) placed inside and coupled to the respective wires of the wiring part 92. The second connector 94 has a plate-like shape and concave portions (deficient portions) 941 are respectively formed on both sides in the width direction of the first component 91A. Further, in the second connector 94, convex portions 942 are formed in the parts closer to the wiring part 92 side than the concave portions 941. The convex portions 942 are respectively formed on both sides in the width direction of the first component 91A.

As shown in FIGS. 12 to 17, there is the second component 95A as the object 95 to be coupled to the first component 91A. The second component 95A has a circuit board 96, a first connector (first female connector) 97 mounted on the circuit board 96, and a second connector (second female connector) 98 mounted in a different position from that of the first connector 97 on the circuit board 96.

The circuit board 96 is a board on which a predetermined circuit pattern (not shown) is provided.

The first connector 97 is the so-called "one-action connector". The first connector 97 is formed as a hollow member in which the first connector 93 of the first component 91A is to be inserted. The first connector 97 has a terminal (not shown) coupled to the terminal of the first connector 93 when the insertion of the first connector 93 is completed. Further, the first connector 97 has an engagement portion 971 engaged with the concave portions 931 of the first connector 93 when the insertion of the first connector 93 is completed. By the engagement of the engagement portion 971, unintended pulling, i.e., detachment of the first connector 93 from the first connector 97 may be prevented.

The second connector 98 is the so-called "one-action connector". The second connector 98 is formed as a hollow member in which the second connector 94 of the first component 91A is to be inserted. The second connector 98 has a terminal (not shown) coupled to the terminal of the second connector 94 when the insertion of the second connector 94 is completed. Further, the second connector 98 has an engagement portion 981 engaged with the concave portions 941 of the second connector 94 when the insertion of the second connector 94 is completed. By the engagement of the engagement portion 981, unintended pulling, i.e., detachment of the second connector 94 from the second connector 98 may be prevented.

The robot 1 may perform coupling work of holding the first component 91A using the end effector 19, coupling the first connector 93 of the first component 91A to the first connector 97 of the second component 95A, and coupling the second connector 94 of the first component 91A to the second connector 98 of the second component 95A (see FIGS. 12 to 17) under control of the control apparatus 20. Next, the coupling work will be explained.

As shown in FIG. 9, the control unit 201 of the control apparatus 20 may sequentially control the first operation (step S101), the second operation (step S102), the third operation (step S103), and the fourth operation (step S104). The control program is stored in the memory unit 208 in advance. The coupling work is performed based on the control program.

Note that, in the coupling work, the second component 95A is mounted on e.g. a workbench 102 in advance. Further, in the mounted second component 95A, the circuit board 96 is placed in parallel to the XY-plane. Furthermore, in the mounted second component 95A, in the embodiment, the first connector 97 faces the positive side in the Z direction and the second connector 98 faces the negative side in the X direction, however, the connectors are not limited to those.

For the coupling work, the position and the posture (facing the positive side in the Z direction) of the first connector 97 of the second component 95A and the position and the posture (facing the negative side in the X direction) of the second connector 98 are stored in the memory unit 208 in advance.

As shown in FIGS. 12 to 17, the specific point P1 is set on the first component 91A (cable 91) or the end effector 19. The specific point P1 is a reference point when movement of the end effector 19 along the longitudinal direction of the first component 91A is started in the third operation. The position and the posture of the specific point P1 are grasped by the position control part 203 and stored in the memory unit 208. The position of the specific point P1 refers to position information on the respective axes of the X-axis, Y-axis, and Z-axis of the specific point P1. The posture of the specific point P1 refers to e.g. information on which direction of the positive side (or negative side) in the X direction, the positive side (or negative side) in the Y direction, and the positive side (or negative side) in the Z direction that the specific point P1 faces.

Note that the specific point P1 may be set on the end effector 19, however, may be set on the distal end of the first connector 93 of the first component 91A (cable 91). Thereby, the specific point P1 may be stably set independent of the type or configuration of the end effector 19, for example.

1 First Operation

First, as shown in FIG. 12, the robot 1 holds the first connector 93 side of the first component 91A using the second suction unit 193 (suction block 82) of the end effector 19. Then, the robot 1 carries the first component 91A while maintaining the holding state to set the specific point P1 (first connector 93) to face the first connector 97 of the second component 95A.

Then, as shown in FIG. 13, the robot 1 moves the first connector 93 together with the end effector 19 downward to the negative side in the Z direction until the force detection unit 7 detects a predetermined force. Thereby, the first operation of inserting the first connector 93 into the first connector 97 of the second component 95A is completed (successful). Note that the movement distance of the specific point P1 is a distance at which the concave portions 931 of the first connector 93 of the first component 91A engage with the engagement portion 971 of the first connector 97 of the second component 95A.

Here, temporal change of the force detected by the force detection unit 7 (an example) when the first operation is successful will be explained with reference to FIG. 18.

Note that the force control part 202 sequentially performs first force control with a first force as a target force in the insertion direction into the first connector 97 (toward the negative side in the Z direction) and second force control with a second force larger than the first force as a target force in the insertion direction into the first connector 97 (toward the negative side in the Z direction). The first force may be any force that does not bend the wiring part 92, and, for example, preferably from 1 N to 5 N and more preferably from 2 N to 4 N. The second force is not particularly limited as long as the first connector 93 can be inserted into the first connector 97, and, for example, preferably from 6 N to 15 N and more preferably from 9 N to 11 N.

After the lowering of the first connector 93 is started (time t0) and before the distal end of the first connector 93 comes into contact with the engagement portion 971 of the first connector 97 of the second component 95A (time t2), the force detected by the force detection unit 7 is zero. This is because the first connector 93 is smoothly inserted into the first connector 97 and the reaction force which the force detection unit 7 receives from the first connector 97 via the first connector 93 is zero.

Note that the force control may be switched from the first force control to the second force control at time t1 in the middle from the time t0 to the time t2. That is, the first force control may be performed from the time t0 to the time t1 and the second force control be performed after the time t1.

Until the distal end of the first connector 93 passes over the engagement portion 971 of the first connector 97 of the second component 95A (time t3), the force detected by the force detection unit 7 increases. This is because the reaction force which the force detection unit 7 receives from the first connector 97 via the first connector 93 increases.

After the distal end of the first connector 93 passes over the engagement portion 971 of the first connector 97 of the second component 95A, the concave portions 931 of the first connector 93 engage with the engagement portion 971 of the first connector 97 of the second component 95A. In this regard, the force detected by the force detection unit 7 once decreases, but then, increases.

As described above, when the first operation is successful, the temporal change of the force changes as shown in the graph of FIG. 18.

On the other hand, when the first operation is unsuccessful, the temporal change of the force is detected by the force detection unit 7 as a change different from that of the graph of FIG. 18. In this case, for example, the first connector 93 may be once moved away from the first connector 97, that is, moved toward the positive side in the Z direction, fine adjustment may be made to the positions of the first connector 93 in the X direction and the Y direction, and the first operation may be executed again.

As described above, when performing the first operation, the control apparatus 20 (robot system 100) may execute pressing control (force control) in the insertion direction into the first connector 97 of the second component 95A (toward the negative side in the Z direction) (see FIG. 9). Thereby, unintended deformation of the first connector 93 due to the pressing force into the first connector 97 may be prevented and the first connector 93 may be properly inserted into the first connector 97.

Further, when performing the first operation, the control apparatus 20 may execute profile control (control) of making the force acting on the first connector 93 of the first component 91A (cable 91) in the directions crossing the insertion direction into the first connector 97 of the second component 95A (X direction and Y direction) close to zero (see FIG. 9). As described above, the impedance control includes the profile control. By the profile control, the first connector 93 may move in the X direction and the Y direction to trace the inner shape of the first connector 97 while being inserted into the first connector 97. Thereby, unintended deformation of the first connector 93 may be prevented and the insertion of the first connector 93 into the first connector 97 may be smoothly and quickly performed.

2 Second Operation

The control unit 201 stores the position and the posture of the specific point P1 after the first operation when the insertion of the first connector 93 of the first component 91A is completed (the first operation is completed), that is, in the state shown in FIG. 13 in the memory unit 208. Thereby, the second operation is executed.

3 Third Operation

As shown in FIG. 14, after the second operation, while holding the first component 91A with the end effector 19, the control unit 201 moves the end effector 19 upward, i.e., in a direction of an arrow α. Note that the unit may move the end effector 19 in a direction in which the wiring part 92 of the first component 91A bends. Then, as shown in FIG. 15, the unit stops the end effector 19 at the movement destination and allows the end effector 19 to hold the second connector 94 side. In this regard, the specific point P1 (first connector 93) faces the second connector 98 of the second component 95A, and the third operation is completed.

Note that the holding force of the end effector 19 on the first component 91A when the end effector 19 is moved in the direction of the arrow α is maintained by the supporting plate 85.

Further, the amount of movement (movement distance) of the end effector 19 when the end effector 19 is moved in the direction of the arrow α is stored in the memory unit 208 in advance. The amount of movement is not particularly limited as long as the second connector 94 can be inserted into the second connector 98, and preferably from 70% to 100% and more preferably from 80% to 90% of the entire length of the first component 91A.

The end effector 19 moves in the direction of the arrow α, and, with reference to the position of the specific point P1, the direction of the arrow α is an opposite direction to the direction that the specific point P1 faces from the position.

The end effector 19 may be accurately moved toward the second connector 94 based on the amount of movement toward the second connector 94 and the position and the posture of the specific point P1.

4 Fourth Operation

As shown in FIG. 16, after the third operation, while holding the second connector 94 side of the first component 91A with the end effector 19, the control unit 201 moves the second connector 94 toward the positive side in the X direction together with the end effector 19. Thereby, the fourth operation of inserting the second connector 94 into the second connector 98 of the second component 95A is completed (successful). Further, when the fourth operation is completed, the concave portion 941 of the second connector 94 of the first component 91A may engage with the engagement portion 981 of the second connector 98 of the second component 95A.

Then, as shown in FIG. 17, the unit releases the holding force of the end effector 19 on the first component 91A and separates the robot 1 together with the end effector 19 from the first component 91A.

Here, the temporal change of the force detected by the force detection unit 7 when the fourth operation is successful is the same as the temporal change of the force detected by the force detection unit 7 when the above described first operation is successful.

Therefore, when the fourth operation is unsuccessful, as is the case where the first operation is unsuccessful, for example, the second connector 94 may be once moved away from the second connector 98, that is, moved toward the negative side in the X direction, fine adjustment may be made to the positions of the second connector 94 in the Y direction and the Z direction, and the fourth operation may be executed again.

When performing the fourth operation, like the first operation, the control apparatus 20 may execute pressing control (force control) in the insertion direction into the second connector 98 of the second component 95A (toward the positive side in the X direction) (see FIG. 9). Thereby, unintended deformation of the second connector 94 due to the pressing force into the second connector 98 may be prevented and the second connector 94 may be properly inserted into the second connector 98.

Further, when performing the fourth operation, like the first operation, the control apparatus 20 may execute profile control (control) of making the force acting on the second connector 94 of the first component 91A (cable 91) in the directions crossing the insertion direction into the second connector 98 of the second component 95A (Y direction and Z direction) close to zero (see FIG. 9). By the profile control, the second connector 94 may move in the Y direction and the Z direction to trace the inner shape of the second connector 98 while being inserted into the second connector 98. Thereby, unintended deformation of the second connector 94 may be prevented and the insertion of the second connector 94 into the second connector 98 may be smoothly and quickly performed.

According to the above described control, using one type of (single) end effector 19, i.e., without replacement by a plurality of types of end effectors 19, the coupling work of coupling the first connector 93 of the first component 91A to the first connector 97 of the second component 95A, and then, further coupling the second connector 94 of the first component 91A to the second connector 98 of the second component 95A may be continuously performed without separation of the end effector 19 from the first component 91A. Thereby, the coupling work may be efficiently and quickly performed.

When the end effector 19 is moved in the direction of the arrow α in the third operation, it is not necessary to change the orientation of the end effector 19 relative to the first component 91A. Thereby, the coupling work may be performed using the end effector 19 regardless of the orientation of the end effector 19.

Second Embodiment

Figure 19:
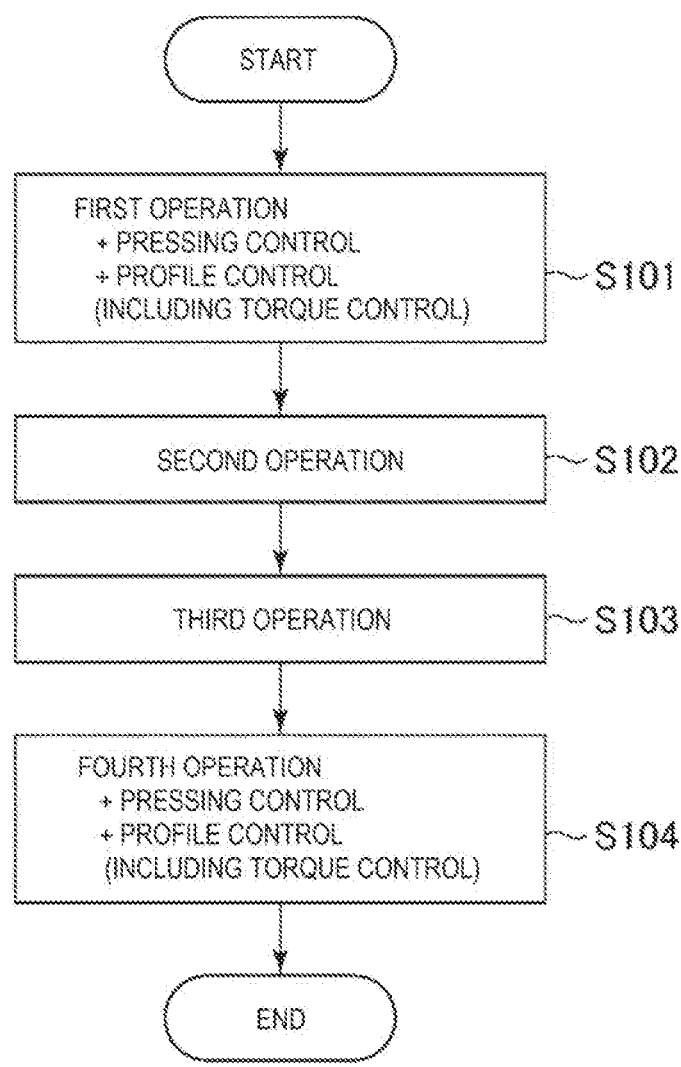
FIG. 19 is a flowchart showing a control operation of a robot control apparatus in a second embodiment of the robot system according to the present disclosure.

FIG. 19 is the flowchart showing the control operation of the robot control apparatus in the second embodiment of the robot system according to the present disclosure.

As below, the second embodiment of the robot control apparatus, the robot, and the robot system according to the present disclosure will be explained with reference to the drawing, and the explanation will be made with a focus on the differences from the above described embodiment and the explanation of the same items will be omitted.

The embodiment is the same as the above described first embodiment except that control by the control apparatus for the coupling work is different.

As shown in FIG. 19, in the embodiment, when the respective operations (pressing control) of the first operation (step S101) and the fourth operation (step S104) are performed, torque control may be executed. The profile control includes the torque control.

The torque control in the first operation is control of making the torque acting on the first connector 93 close to zero when the first connector 93 of the first component 91A is inserted into the first connector 97 of the second component 95A, if the first connector 93 is inclined relative to the first connector 97 and collides with the first connector 97. The torque refers to torque about an axis parallel to the thickness direction of the first component 91A. The torque control in combination with the profile control in the first operation may smoothly and quickly perform the insertion of the first connector 93 into the first connector 97.

The torque control in the fourth operation is control of making the torque acting on the second connector 94 close to zero when the second connector 94 of the first component 91A is inserted into the second connector 98 of the second component 95A, if the second connector 94 is inclined relative to the second connector 98 and collides with the second connector 98. The torque refers to torque about an axis parallel to the thickness direction of the first component 91A. The torque control in combination with the profile control in the fourth operation may smoothly and quickly perform the insertion of the second connector 94 into the second connector 98.

Note that the first operation and the fourth operation respectively perform torque control during the respective operations, however, for example, the torque control may be omitted in one of the operations.

Third Embodiment

Figure 20:
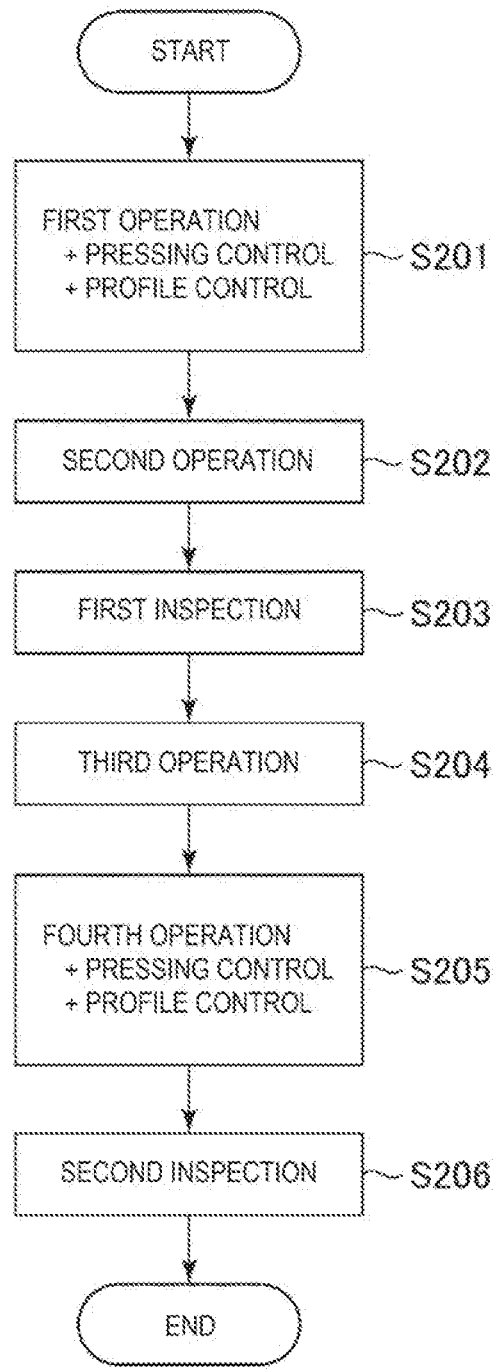
FIG. 20 is a flowchart showing a control operation of a robot control apparatus in a third embodiment of the robot system according to the present disclosure.

FIG. 20 is the flowchart showing the control operation of the robot control apparatus in the third embodiment of the robot system according to the present disclosure.

As below, the third embodiment of the robot control apparatus, the robot, and the robot system according to the present disclosure will be explained with reference to the drawing, and the explanation will be made with a focus on the differences from the above described embodiments and the explanation of the same items will be omitted.

The embodiment is the same as the above described first embodiment except that control by the control apparatus for the coupling work is different.

As shown in FIG. 20, in the embodiment, the control unit 201 of the control apparatus 20 may sequentially control a first operation (step S201), a second operation (step S202), a first inspection (step S203), a third operation (step S204), a fourth operation (step S205), and a second inspection (step S206). Step S201 is the same as step S101 in the above described first embodiment. Step S202 is the same as step S102 in the above described first embodiment. Step S204 is the same as step S103 in the above described first embodiment. Step S205 is the same as step S104 in the above described first embodiment.

The first inspection is an inspection of determining (confirming) whether or not the first connector 93 of the first component 91A is accurately inserted into the first connector 97 of the second component 95A. The first inspection is performed by pulling the first connector 93 in the opposite direction to the insertion direction into the first connector 97 using the end effector 19. In this regard, when the first connector 93 moves to a predetermined distance, inaccuracy of the insertion of the first connector 93 is determined. Or, when the first connector 93 does not move to the predetermined distance, accuracy of the insertion of the first connector 93 is determined. Note that the predetermined distance in the first inspection is stored as a first threshold value in the memory unit 208. The first threshold value is not particularly limited as long as the movement of the first connector 93 is allowed after insertion into the first connector 93, but e.g. preferably from 0.5 mm to 5 mm and more preferably from 1 mm to 2 mm.

The second inspection is an inspection of determining (confirming) whether or not the second connector 94 of the first component 91A is accurately inserted into the second connector 98 of the second component 95A. The second inspection is performed by pulling the second connector 94 in the opposite direction to the insertion direction into the second connector 98 using the end effector 19. In this regard, when the second connector 94 moves to a predetermined distance, inaccuracy of the insertion of the second connector 94 is determined. Or, when the second connector 94 does not move to the predetermined distance, accuracy of the insertion of the second connector 94 is determined. Note that the predetermined distance in the second inspection is stored as a second threshold value in the memory unit 208. The second threshold value is not particularly limited as long as the movement of the second connector 94 is allowed after insertion into the second connector 94, but e.g. preferably from 0.5 mm to 5 mm and more preferably from 1 mm to 2 mm.

Note that the first inspection and the second inspection are respectively performed by pulling of the first component 91A in the embodiment, however, may be performed by imaging of the first component 91A using an imaging apparatus such as a camera, for example.

The time when the first inspection is performed is between the second operation and the third operation in the embodiment, however, may be next to the fourth operation, for example.

Further, the time when the second inspection is performed is next to the fourth operation in the embodiment, however, when the first inspection is performed next to the fourth operation, may be next to the first inspection.

Fourth Embodiment

Figure 21:
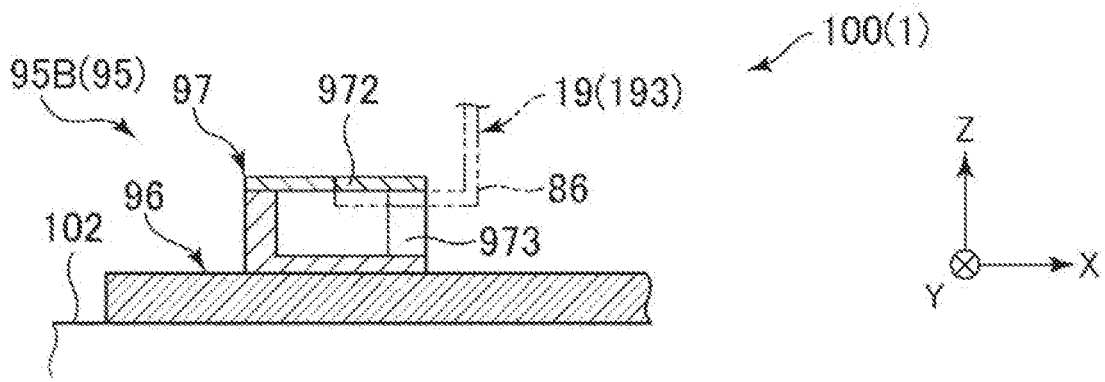
FIG. 21 is a partial vertical sectional view for sequential explanation of work in a fourth embodiment of the robot system according to the present disclosure.
Figure 22:
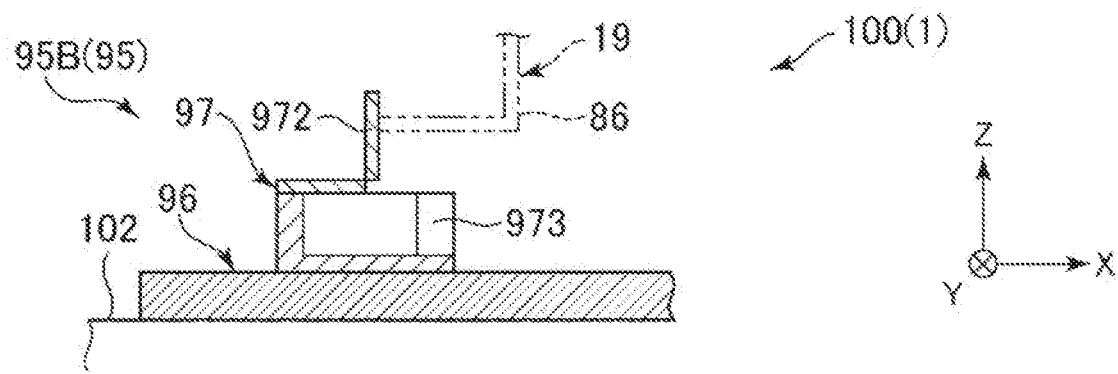
FIG. 22 is a partial vertical sectional view for sequential explanation of the work in the fourth embodiment of the robot system according to the present disclosure.
Figure 23:
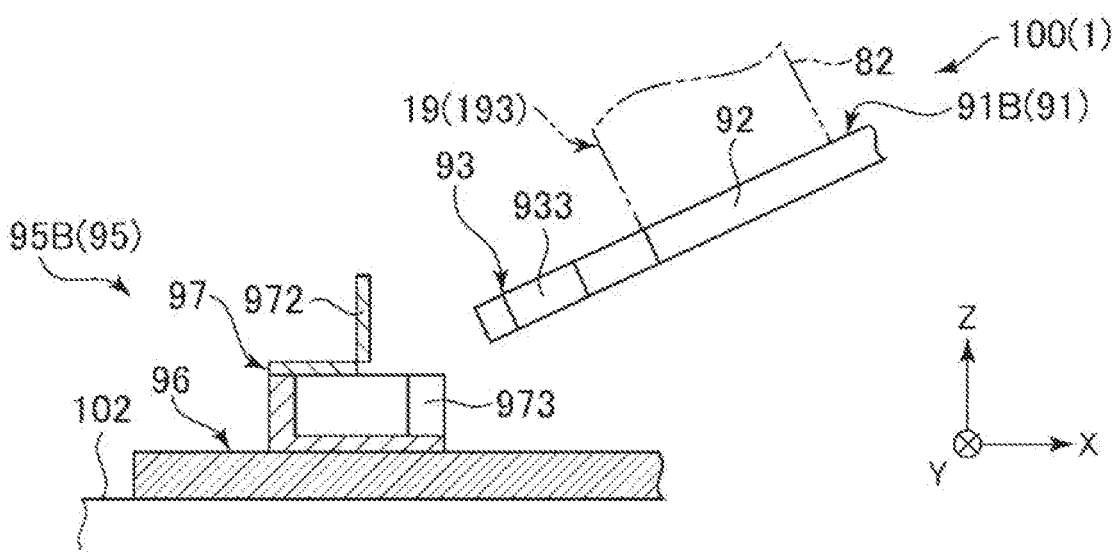
FIG. 23 is a partial vertical sectional view for sequential explanation of the work in the fourth embodiment of the robot system according to the present disclosure.
Figure 24:
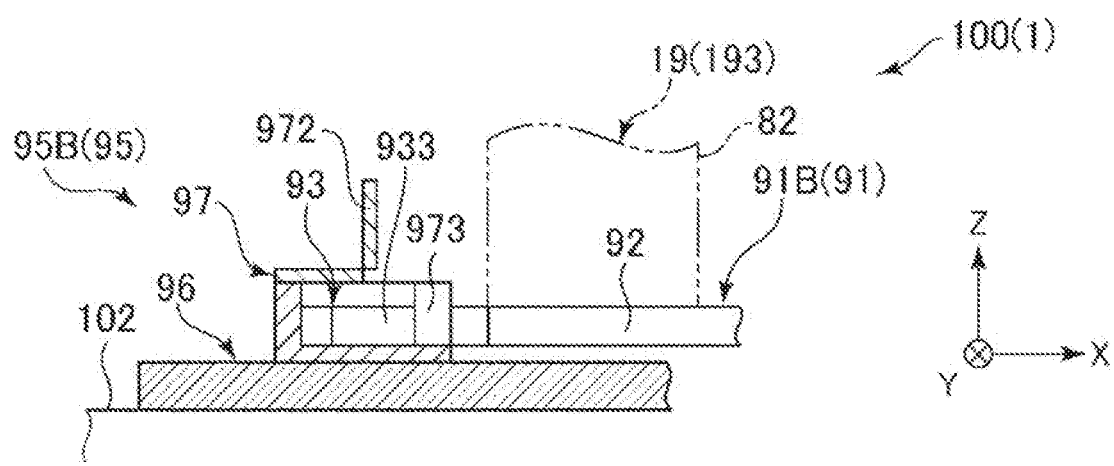
FIG. 24 is a partial vertical sectional view for sequential explanation of the work in the fourth embodiment of the robot system according to the present disclosure.
Figure 25:
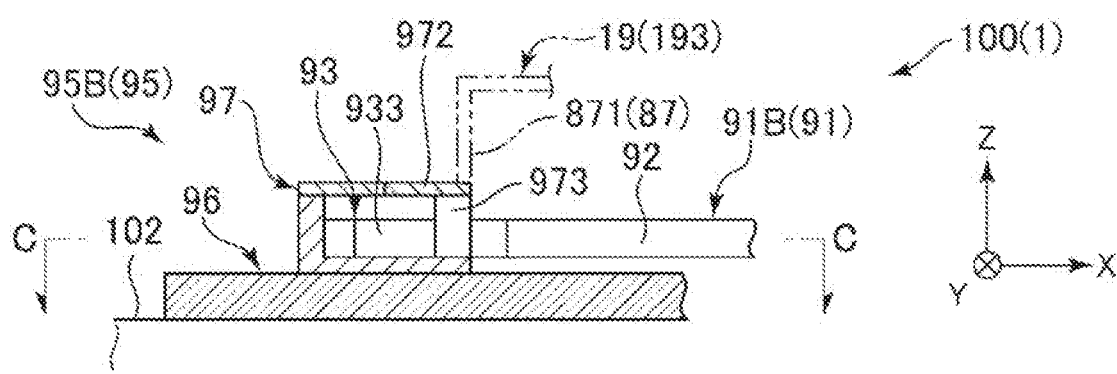
FIG. 25 is a partial vertical sectional view for sequential explanation of the work in the fourth embodiment of the robot system according to the present disclosure.
Figure 26:
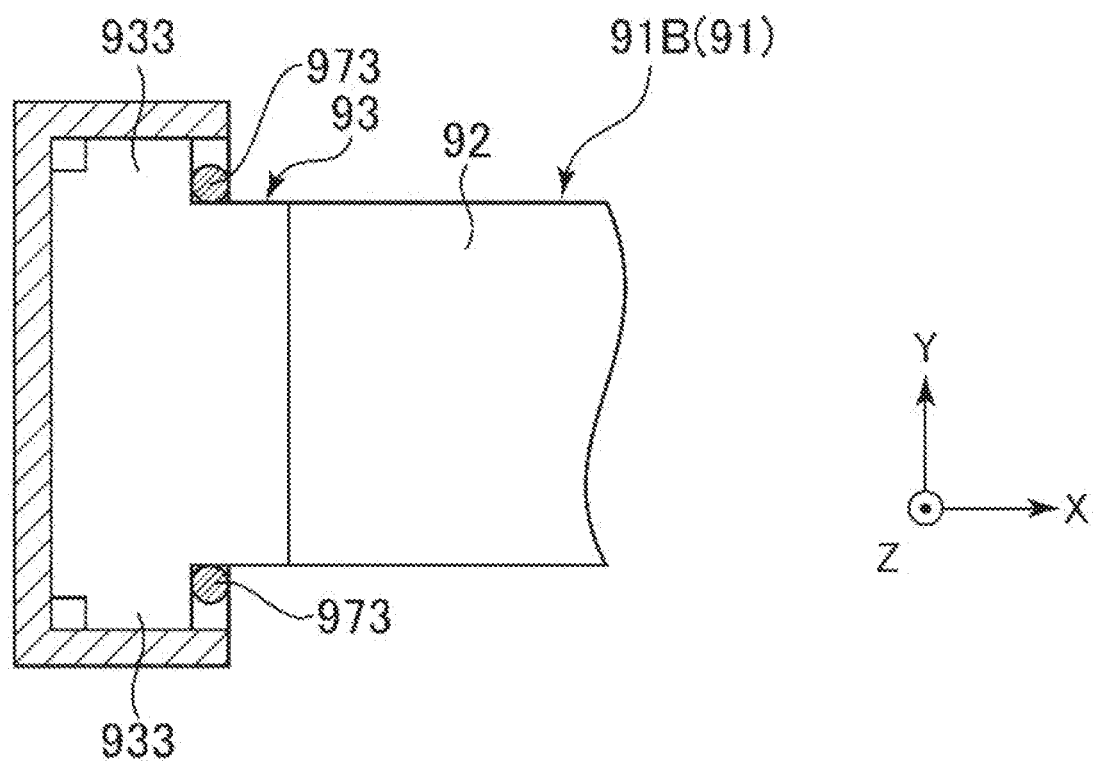
FIG. 26 is a sectional view along line C-C in FIG. 25.

FIG. 21 is the partial vertical sectional view for sequential explanation of work in the fourth embodiment of the robot system according to the present disclosure. FIG. 22 is the partial vertical sectional view for sequential explanation of the work in the fourth embodiment of the robot system according to the present disclosure. FIG. 23 is the partial vertical sectional view for sequential explanation of the work in the fourth embodiment of the robot system according to the present disclosure. FIG. 24 is the partial vertical sectional view for sequential explanation of the work in the fourth embodiment of the robot system according to the present disclosure. FIG. 25 is the partial vertical sectional view for sequential explanation of the work in the fourth embodiment of the robot system according to the present disclosure. FIG. 26 is the sectional view along line C-C in FIG. 25.

As below, the fourth embodiment of the robot control apparatus, the robot, and the robot system according to the present disclosure will be explained with reference to these drawings, and the explanation will be made with a focus on the differences from the above described embodiments and the explanation of the same items will be omitted.

The embodiment is the same as the above described first embodiment except that the configurations (shapes) of the first member and the second member are different.

In the embodiment, the cable 91 to be held by the end effector 19 of the robot 1 is a first component 91B. Further, the object 95 to be coupled to the first component 91B is a second component 95B.

As shown in FIG. 26, in the first component 91B, the first connector (first male connector) 93 provided in one end portion of the wiring part 92 (in the left end portion in the drawing) has convex portions 933 respectively formed on both sides in the width direction of the first component 91B. Note that the first component 91B has a second connector (not shown) having the same configuration (shape) as the first connector 93 in the embodiment on the opposite side to the first connector 93.

As shown in FIGS. 21 to 25, in the second component 95B, the first connector (first female connector) 97 mounted on the circuit board 96 is the so-called "two-action connector". The first connector 97 has a lid portion 972 that can open and close by rotating about an axis parallel to the Y direction. Further, the first connector 97 has an engagement portion 973 that engages with the convex portions 933 of the first connector 93 when the insertion of the first connector 93 is completed. By the engagement of the engagement portion 973, unintended pulling, i.e., detachment of the first connector 93 from the first connector 97 may be prevented (see FIG. 26). Note that the second component 95B has a second connector (not shown) having the same configuration (shape) as the first connector 97 in the embodiment on the opposite side to the first connector 97.

The first component 91B and the second component 95B having the above described configurations are coupled in the following manner. Note that the coupling process (first operation) between the first connector 93 of the first component 91B and the first connector 97 of the second component 95B is the same as the coupling process (fourth operation) between the second connector of the first component 91B and the second connector of the second component 95B, and the former coupling process will be representatively explained.

First, as shown in FIG. 21, the robot 1 engages the first engagement member 86 of the end effector 19 with the lid portion 972 of the first connector 97 of the second component 95B. Then, as shown in FIG. 22, the robot lifts the lid portion 972 without change using the end effector 19. Thereby, the lid portion 972 is opened.

Then, as shown in FIG. 23, the robot 1 holds the first connector 93 side of the first component 91B using the second suction unit 193 (suction block 82) of the end effector 19. Then, the robot moves the first connector 93 together with the end effector 19 toward the negative side in the Z direction and toward the negative side in the X direction while inclining the connector at a predetermined angle relative to the XY-plane. Note that the inclination angle is not particularly limited, but e.g. preferably from 5 degrees to 30 degrees and more preferably from 15 degrees to 20 degrees.

Then, when the first connector 93 comes into contact with the first connector 97, as shown in FIG. 24, the robot makes the posture of the first connector 93 parallel to the XY-plane.

Then, the robot engages the hook portions 871 of the second engagement member 87 of the end effector 19 with the opened lid portion 972 of the first connector 97. Then, as shown in FIG. 25, the robot presses the lid portion 972 without change toward the positive side in the X direction using the end effector 19. Thereby, the lid portion 972 may be closed and the first operation of inserting the first connector 93 into the first connector 97 is completed (successful).

After the first operation, the operations of the second operation and the subsequent operations are sequentially performed as described in the first embodiment.

Figure 27:
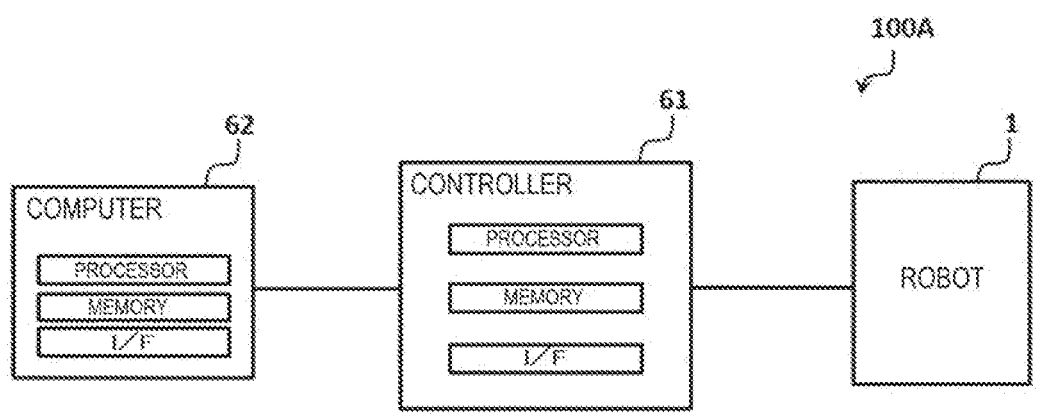
FIG. 27 is a block diagram for explanation of the first embodiment to fourth embodiment with a focus on hardware (processor).

FIG. 27 is the block diagram for explanation of the first embodiment to fourth embodiment with the focus on hardware (processor).

FIG. 27 shows an overall configuration of a robot system 100A in which the robot 1, a controller 61, and a computer 62 are coupled. The control of the robot 1 may be executed by reading commands in a memory using a processor in the controller 61 or by reading commands in a memory using a processor in the computer 62 via the controller 61.

Therefore, both or one of the controller 61 and the computer 62 may be regarded as "robot control apparatus (control apparatus)".

Modified Example 1

Figure 28:
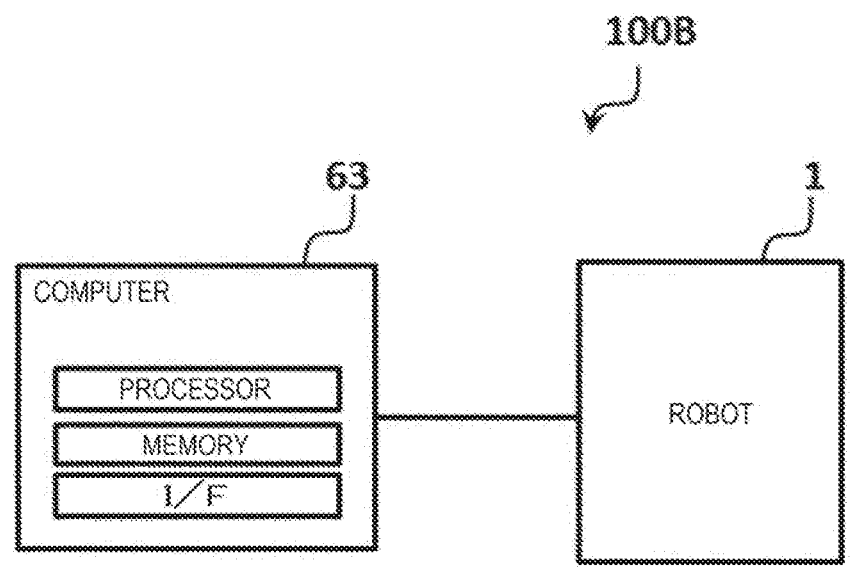
FIG. 28 is a block diagram showing another example 1 (modified example 1) of the robot system according to the present disclosure.

FIG. 28 is the block diagram showing the other example 1 (modified example 1) of the robot system according to the present disclosure.

FIG. 28 shows an overall configuration of a robot system 100B in which a computer 63 is directly coupled to the robot 1. The control of the robot 1 is directly executed by reading commands in a memory using a processor in the computer 63.

Therefore, the computer 63 may be regarded as "robot control apparatus (control apparatus)".

Modified Example 2

Figure 29:
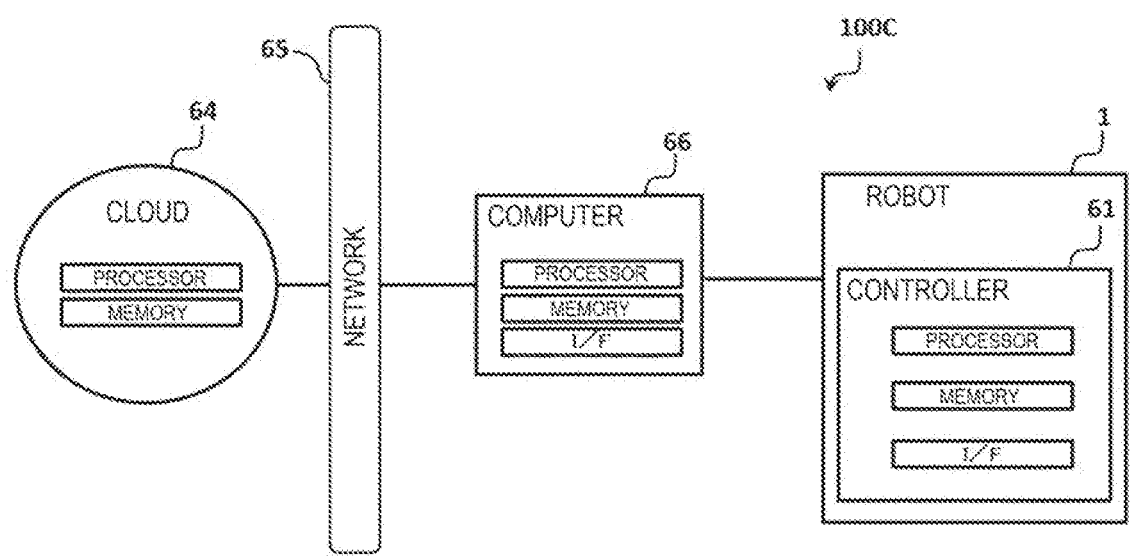
FIG. 29 is a block diagram showing another example 2 (modified example 2) of the robot system according to the present disclosure.

FIG. 29 is the block diagram showing the other example 2 (modified example 2) of the robot system according to the present disclosure.

FIG. 29 shows an overall configuration of a robot system 100C in which the robot 1 containing the controller and a computer 66 are coupled and the computer 66 is coupled to a cloud 64 via a network 65 such as LAN. The control of the robot 1 may be executed by reading commands in a memory using a processor in the computer 66 or by reading commands in a memory using a processor on the cloud 64 via the computer 66.

Therefore, one, two, or three (all) of the controller 61, the computer 66, and the cloud 64 may be regarded as "robot control apparatus (control apparatus)".

As above, the robot control apparatus, the robot, and the robot system according to the present disclosure are explained according to the illustrated embodiments, however, the present disclosure is not limited to those and the respective parts forming the robot control apparatus, the robot, and the robot system may be replaced by arbitrary configurations that may fulfill the same functions. Further, other arbitrary configurations may be added thereto.

Furthermore, the robot control apparatus, the robot, and the robot system according to the present disclosure may include a combination of two or more arbitrary configurations (features) of the above described respective embodiments.

In the above described embodiments, the memory unit is a component element of the control apparatus, however, in the present disclosure, the memory unit may be separately provided from the control apparatus, not as the component element of the control apparatus.

In the above described embodiments, the location to which the base of the robot is fixed is e.g. the floor in the installation space, however, in the present disclosure, includes e.g. a ceiling, wall, workbench, and the ground. Or, the base itself may be movable.

In the present disclosure, the robot may be installed within a cell. In this case, the location to which the base of the robot is fixed includes e.g. a floor part, ceiling part, and wall part of the cell, and a workbench.

In the above described embodiments, the first surface as a plane (surface) to which the robot (base) is fixed is a plane (surface) parallel to the horizontal plane, however, in the present disclosure, may be e.g. a plane (surface) inclined relative to the horizontal plane or vertical plane or a plane (surface) parallel to the vertical plane. That is, the first pivot axis may be inclined relative to the vertical direction or horizontal direction, parallel to the horizontal direction, or parallel to the vertical direction.

Further, in the above described embodiments, the number of pivot axes of the robot arm is six, however, in the present disclosure, the number of pivot axes of the robot arm may be e.g. two, three, four, five, seven, or more. That is, in the above described embodiments, the number of arms (links) is six, however, in the present disclosure, the number of arms may be e.g. two, three, four, five, seven, or more. In this case, for example, in the robot of the above described embodiments, the robot having seven arms may be realized by addition of an arm between the second arm and the third arm.

Furthermore, in the above described embodiments, the number of robot arms is one, however, in the present disclosure, the number of robot arms may be e.g. two or more. That is, the robot (robot main body) may be e.g. a multi-arm robot such as a dual-arm robot.

In the present disclosure, the robot may be another type of robot. Specific examples include e.g. a legged walking (running) robot having leg parts and a horizontal articulated robot such as a scalar robot.

Further, the processor may be formed by a single apparatus or a plurality of apparatuses. That is, the processor may be divided in a plurality of unit processors.

Specifically, the processor may include e.g. a first processor that can control the robot by force control based on the force detected by the force detection unit and a second processor that can determine whether or not a result of fitting work of holding the cable and fitting the cable in an object by the robot is successful. The processor may further has a third processor.

What is claimed is:

1. A robot control apparatus comprising:
a processor that is configured to control a robot having a robot arm to which an end effector is attached, holding a cable having flexibility using the end effector, coupling one end of the cable to a first connector, and inserting the other end of the cable into a second connector,
wherein the processor is configured to:
insert the one end of the cable into the first connector while holding a side of one end of the cable using the end effector;
store a position and a posture of a specific point on the cable or the end effector when the insertion of the one end of the cable into the first connector is completed;
move the end effector along the cable toward a side of the other end of the cable based on an amount of movement toward the other end of the cable stored in advance and the position and the posture while guiding the cable using the end effector;
hold the side of the other end of the cable using the end effector; and insert the other end of the cable into the second connector while holding the side of the other end of the cable using the end effector.

2. The robot control apparatus according to claim 1, executing force control in an insertion direction into the first connector when inserting the one end of the cable into the first connector while holding the side of one end of the cable using the end effector.

3. The robot control apparatus according to claim 1, executing force control in an insertion direction into the second connector when inserting the other end of the cable into the second connector while holding the side of the other end of the cable using the end effector.

4. The robot control apparatus according to claim 1, executing control of making a force acting on the cable in a direction crossing an insertion direction into the first connector close to zero when inserting the one end of the cable into the first connector while holding the side of one end of the cable using the end effector.

5. The robot control apparatus according to claim 1, executing control of making a force acting on the cable in a direction crossing an insertion direction into the second connector close to zero when inserting the other end of the cable into the second connector while holding the side of the other end of the cable using the end effector.

6. The robot control apparatus according to claim 1, wherein the specific point is set on the cable.

7. A robot system comprising:
a robot having a robot arm to which an end effector is attached; and
the robot control apparatus including a processor is configured to control the robot that holds a cable having flexibility using the end effector, couples one end of the cable to a first connector, and inserts the other end of the cable into a second connector,
wherein the processor is configured to:
insert the one end of the cable into the first connector while holding a side of one end of the cable using the end effector;
store a position and a posture of a specific point on the cable or the end effector when the insertion of the one end of the cable into the first connector is completed;
move the end effector along the cable toward a side of the other end of the cable based on an amount of movement toward the other end of the cable stored in advance and the position and the posture while guiding the cable using the end effector,
hold the side of the other end of the cable using the end effector; and
insert the other end of the cable into the second connector while holding the side of the other end of the cable using the end effector.

* * * * *